(12) United States Patent
Fukuda

(10) Patent No.: US 7,340,104 B2
(45) Date of Patent: Mar. 4, 2008

(54) CORRECTION PARAMETER DETERMINING METHOD, CORRECTION PARAMETER DETERMINING APPARATUS, COMPUTER PROGRAM, AND RECORDING MEDIUM

(75) Inventor: Yasuo Fukuda, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 750 days.

(21) Appl. No.: 10/860,702

(22) Filed: Jun. 3, 2004

(65) Prior Publication Data
US 2004/0247197 A1 Dec. 9, 2004

(30) Foreign Application Priority Data
Jun. 6, 2003 (JP) ............... 2003-162574

(51) Int. Cl.
*G06K 9/40* (2006.01)
*G06K 9/32* (2006.01)
*G06K 15/00* (2006.01)
(52) U.S. Cl. .............. 382/254; 382/274; 382/294
(58) Field of Classification Search ........... 382/254, 382/270, 162, 167, 276, 293, 294; 358/1–9, 358/518, 450, 464, 465
See application file for complete search history.

(56) References Cited

U.S. PATENT DOCUMENTS 6,459,819 B1* 10/2002 Nakao ............... 382/284
6,862,373 B2* 3/2005 Enomoto ............ 382/263
6,954,288 B2* 10/2005 Uekusa et al. ........ 358/1.9
7,113,307 B1* 9/2006 Ohkubo ............. 358/1.9

OTHER PUBLICATIONS

Japan Electronics and Information Technology Industries Association; "Exchangeable Image File Format for Digital Still Cameras: Exif Version 2.2"; Jeita CP-3451; Apr. 2002; (150 pages).

* cited by examiner

*Primary Examiner*—Yon J. Couso
(74) *Attorney, Agent, or Firm*—Morgan & Finnegan LLP

(57) ABSTRACT

In order to enable preferable determination of correction parameter values of image information including a plurality of object areas, each of the correction parameter values for correcting the image information is calculated for each of a plurality of object areas included in input image information on the basis of a feature amount and an importance degree of each area, and a correction parameter value for correcting the input image information is determined by synthesizing the respective calculated correction parameter values, whereby a position and an areal size or brightness of each object area can be reflected in the correction parameter value, and one correction parameter value for the whole input image can be determined.

31 Claims, 12 Drawing Sheets

CORRECTION PARAMETER DETERMINING METHOD, CORRECTION PARAMETER DETERMINING APPARATUS, COMPUTER PROGRAM, AND RECORDING MEDIUM

BACKGROUND OF THE INVENTION

1. Field of the Invention

The present invention relates generally to a parameter determining method suitable particularly for use in a correcting means for automatically correcting a portrait image.

2. Related Background Art

Digital images have hitherto been subjected to a variety of image processing such as adjusting saturation, a color tone, a contrast and gradations. It is general in the prior arts that when executing the image processing, an operator having knowledge specialized in the images utilizes specialized or dedicated pieces of software and employs the empirical knowledge, thereby obtaining a preferable image on a trial-and-error basis in a way that checks a result of the image processing on a monitor screen of a computer, and so on.

Over the recent years, a wide spread of digital cameras has advanced as if towed by the spread of the Internet. This is because a result (data) acquired by photographing with the digital camera is easy-to-read file formatted data on a computer. This facilitates such an operation that, for example, an image captured by the digital camera is stored on a server on WWW (World Wide Web) and is opened in public to a third party.

Another fact is that the spread of the digital cameras induces a rise in digital image data around users who have been unfamiliar so far with the image (data).

The users of the digital camera would be considered insufficient of the knowledge about the camera though they have in-depth knowledge about the computer rather than those who have so sufficient knowledge about the conventional analog cameras as to have a good capability of using these analog cameras.

Therefore, the images captured by the digital camera are not invariably images captured under preferable conditions. Even an image captured under unpreferable conditions can not be invariably discarded if a content of this image is important to a photographer. For this reason, there is a desire for an image correcting method capable of obtaining a proper image even from the image captured under the unpreferable conditions.

Further, as described earlier, it appears to be preferable that the image correcting method functions automatically or semi-automatically in terms of such points that the users are not invariably those who are familiar with the cameras or the image (data) and that the image data increases.

Further, in the case of a portrait photo, a main emphasized area is a face of a person as an object, and it is preferable that the face area exhibits proper brightness. Hence, if not photographed with the proper brightness, it is expected to be preferable that the image is so corrected as to be adjusted to the suitable brightness.

As for the brightness adjustment described above, according to the great majority of known image correcting methods, an image brightness distribution state is examined, and several percents of levels from the bright side and from the dark side are set as a highlight point, a shadow point, etc. Then, major processing is that a level extension is conducted so that the highlight point becomes approximately a maximum value of the brightness or the shadow point becomes approximately a minimum value of the brightness, and that a $\gamma$-correction is executed based on average luminance of the whole image.

The conventional image correcting methods are, however, methods that emphasize separately only the brightness of one face area. Namely, the conventional image correcting methods did not, though capable of adjusting the brightness of each of the face areas in case that a photo generally contains a plurality of faces of persons, provide any means for determining one correction parameter value by integrating a plurality of correction parameter values of the face areas.

SUMMARY OF THE INVENTION

It is a primary object of the present invention to solve all or at least one of the problems described above.

It is another object of the present invention, which was devised in view of the aforementioned problems, to enable determination of a correction parameter value with which a whole image can be preferably corrected, by integrating respective correction parameter values corresponding to a plurality of predetermined areas.

To accomplish the above objects, according to the present invention, a method of determining correction parameters for correcting inputted image information includes an information inputting step of inputting the image information and area information about a plurality of areas included in the image information, a correction parameter calculating step of calculating a correction parameter value for correcting the image information, for each of the plurality of areas included in the image information inputted in the information inputting step, and a correction parameter synthesizing step of generating a correction parameter value for correcting the inputted image information by synthesizing the respective correction parameters calculated in the correction parameter calculating step.

Other objects and features of the present invention will become apparent from the descriptions of the embodiments and the drawings that follow.

DETAILED DESCRIPTION OF THE PREFERRED EMBODIMENTS

An in-depth description of one embodiment of the present invention will hereinafter be given with reference to the drawings.

First Embodiment

Figure 1:
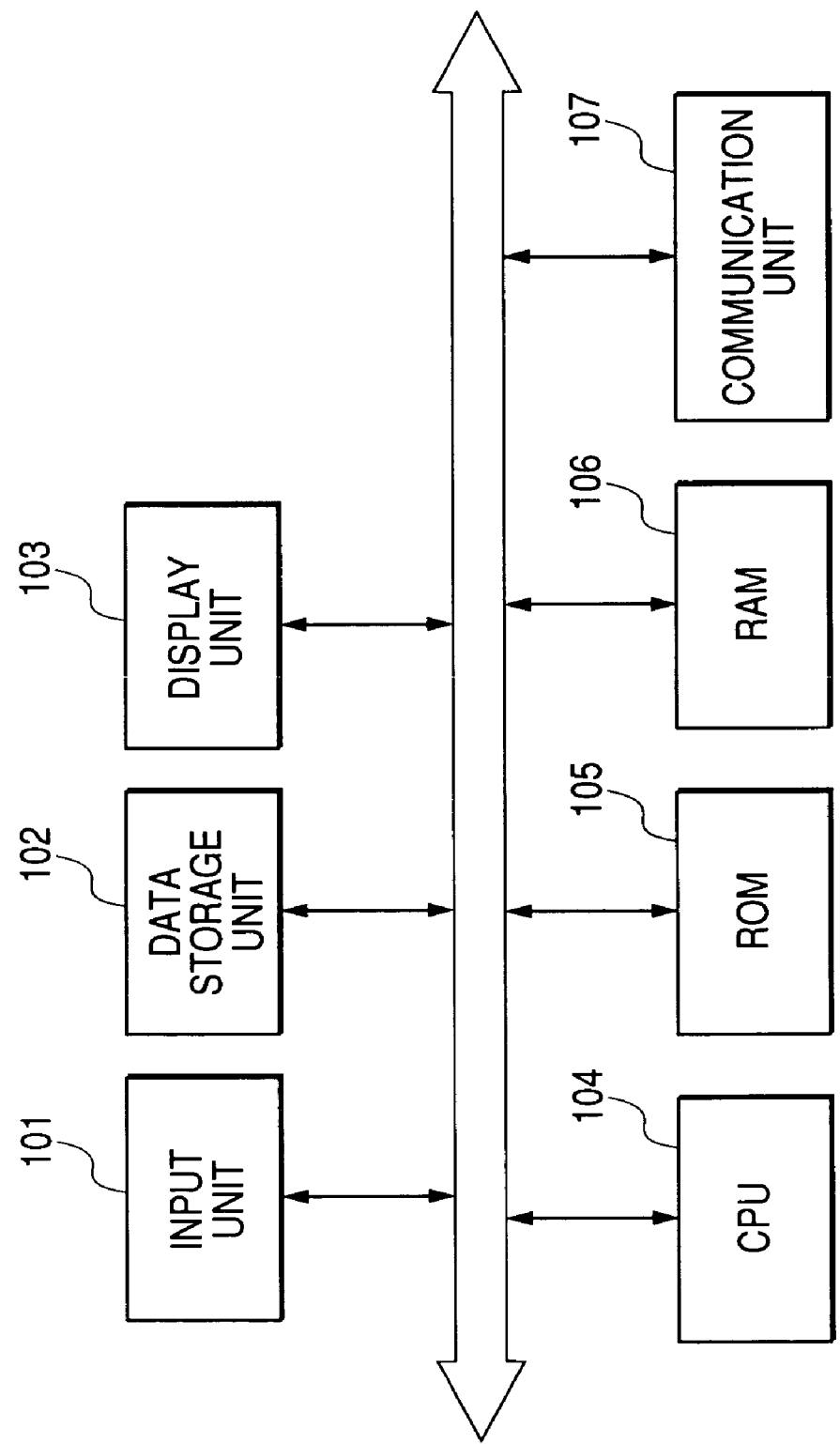
FIG. 1 is a block diagram showing one example of a construction of an image processing apparatus capable of actualizing a parameter determining method in an embodiment.

FIG. 1 is a block diagram showing one example of a construction of an image processing apparatus 10 capable of actualizing a parameter determining system according to the present invention.

In FIG. 1, an input unit 101 is a device for inputting instructions and data from a user, and includes, for instance, a keyboard and a pointing device. It should be noted that the pointing device can be exemplified such as a mouse, a trackball, a trackpad or a tablet, etc. Alternatively, when the parameter determining system of the present invention is applied to, e.g., a known digital camera apparatus, this input unit 101 may also be constructed of buttons, mode dials, etc.

A data storage unit 102 is a unit for storing image data and is normally constructed of a hard disk, a floppy (R) disk, a CD-ROM, a CD-R, a memory card, a CF (Compact Flash) card, a SmartMedia card, an SD memory card or a MEMORY STICK card, and so on. Further, the data storage unit 102 can also be stored with programs and other categories of data.

A communication unit 107 is defined as an interface (I/F) such as a known serial or parallel interface for performing communications between appliances. Herein, a communication system for the communication unit 107 may be a wired communication system using a known LAN technology like Ethernet and based on interface standards such as USB (Universal Serial Bus), IEEE1284, IEEE1394, etc., or may also be a wireless communication system using infrared-rays, based on wireless standards such as IEEE802.11b, and using a wireless technology like Bluetooth, and so forth.

A display unit 103 is a device for displaying images before or after being subjected to image processing, or for displaying images as by GUI (Graphic User Interface), etc. The display unit 103 generally involves using a CRT, a liquid crystal display and so on. Alternatively, the display unit 103 may also be an external display device connected via a cable, etc. to the image processing apparatus 10.

A CPU denoted by the numeral 104 governs operation control of all the constructive units described above. A ROM 105 and a RAM 106 provide the CPU 104 with programs, data, operation areas, etc. that are needed for processing of the respective constructive units. Further, the data storage unit 102 or the ROM 105 is stored with a control program necessary for processing for determining a correction parameter that will be explained later on. Note that the control program is, in the case of its being stored on the ROM 105, temporarily read into the RAM 106 and then executed.

Further, another scheme may be taken, wherein an unillustrated known image input means such as a CCD is provided, and the image is inputted by the image input means and stored in the data storage unit 102.

It is to be noted that the image processing apparatus 10 further includes a variety of components other than the above-described components, however, those other components are not essential to the present invention, and hence their explanations are omitted.

Figure 2:
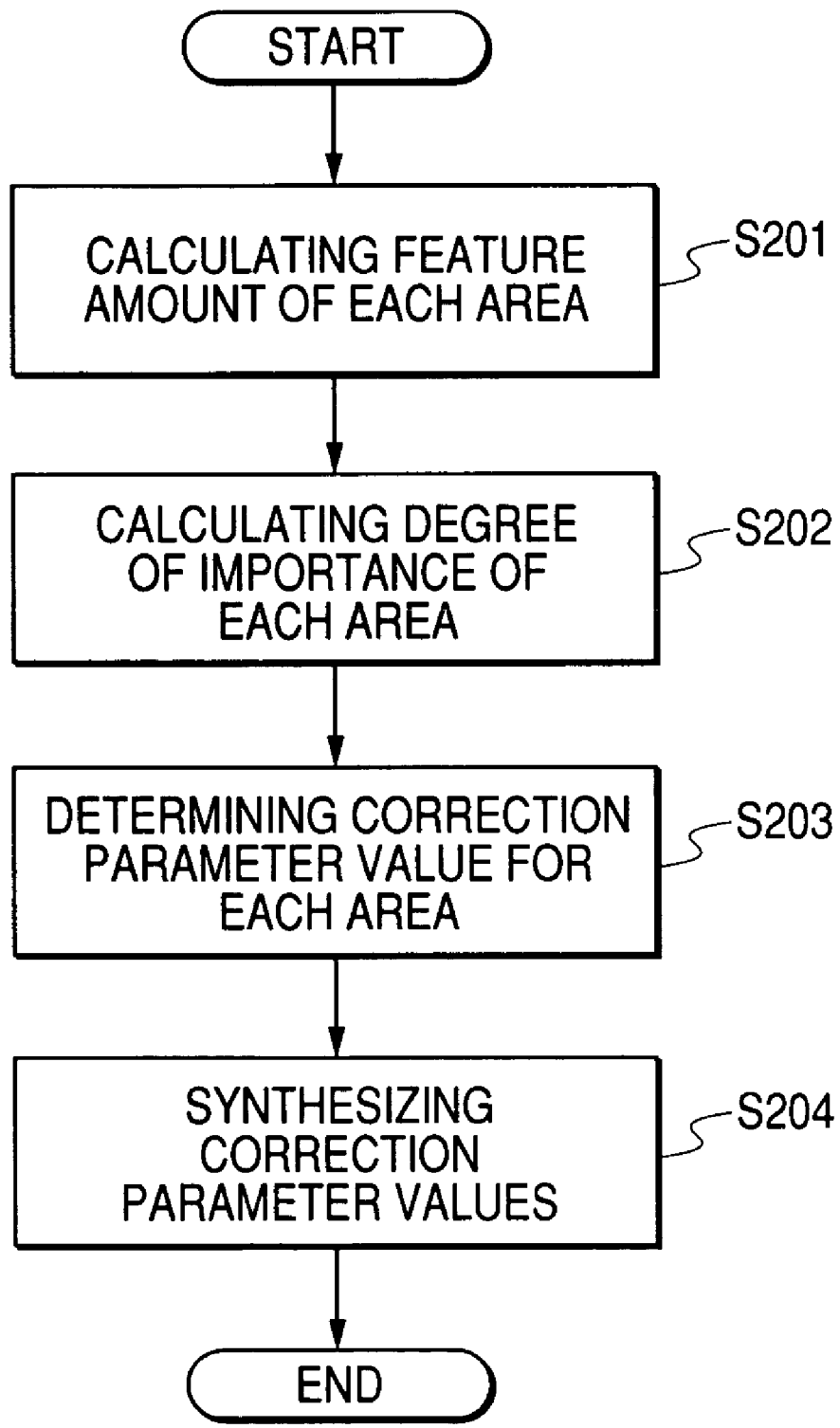
FIG. 2 is a flowchart showing an operation procedure of the image processing apparatus in a first embodiment.

FIG. 2 is a flowchart showing an operation procedure of the image processing apparatus 10 in the first embodiment.

Input information of the image processing apparatus 10 in the first embodiment are original image data (containing data about a width and a height of the image), two or more area information and the number of areas.

The area information is information that represents, e.g., a face area. Arbitrary shapes such as a rectangular shape, a circular shape, an elliptical shape, a polygonal shape, etc. are applied as shapes of the face area in the present invention. According to the first embodiment, for simplifying the explanation, the discussion will proceed on the assumption that the shape of the face area is a rectangular shape parallel to a horizontal direction and a vertical direction of the image. Note that the present invention is, as a matter of course, applied to a main object area other than the face area that is represented by the area information.

Figure 9:
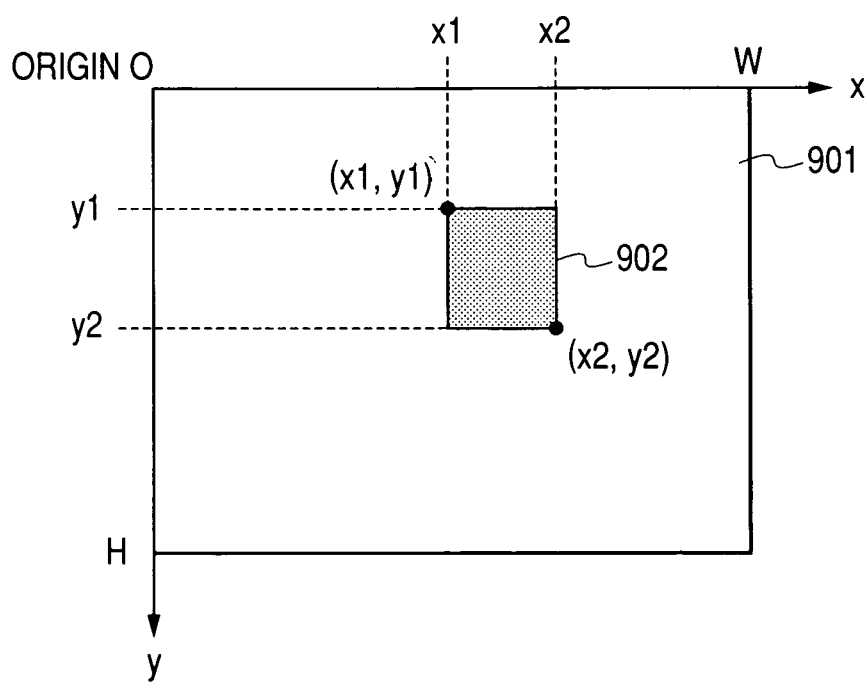
FIG. 9 is a diagram showing an example of the area information.

FIG. 9 is a diagram showing an example of the area information. In FIG. 9, the numeral 901 denotes an area of an original image. The original image 901 has a size defined by a width W in the horizontal direction and a height H in the vertical direction. Further, for expressing positional coordinates of the area information, a coordinate system is set, wherein a left upper corner of the image is set as an origin, an x-axis extends rightwards in the horizontal direction, and a y-axis extends downwards in the vertical direction.

Moreover, the description in the first embodiment is made based on the assumption that the original image is expressed in RGB color spaces, and each of channels has an 8-bit integer value, i.e., a value of 0 to 255.

The numeral 902 in FIG. 9 denotes an area representing a face area. As explained earlier, the area 902 is the rectangular area parallel to the horizontal direction and the vertical direction of the image, and can be therefore defined (expressed) by a point (x1, y1) as a coordinate value at a left upper corner of the area 902 and by a point (x2, y2) as a coordinate value at a right lower corner of the area 902.

Accordingly, in the case of the first embodiment, the explanation is made on the premise that the coordinate values (x1, y1) and (x2, y2) of these two points are given as area information representing one face area to the image processing apparatus 10. The representation of this area (face area) 902 involves using an expression such as the area (x1, y1)–(x2, y2).

There must be no problem if a method of generating the area information (face area information) is set as an arbitrary generation method. The generation method may be, for example, a known face detection system by which the area information is automatically detected and generated, or a method by which the image is displayed on the display unit 103 and a user designates, as an area, part of the range on the displayed image by use of the input unit 101 (the mouse, the tablet, the button, etc.).

For the following discussion, parameters are defined as below.

(1) The number-of-areas N: "N" is the number of should-be-corrected areas (face areas), which is inputted to the present image processing apparatus 10 (N>0).

(2) Area information (k): (k) is information representing a j-th ($0 \leq j < N$) face area to be inputted to the present image processing apparatus 10. In the case of the first embodiment, the area information (k) corresponds to a coordinate value (x1(k), y1(k)) at the left upper corner of the area and to a coordinate value (x2(k), y2(k)) at the right lower corner of the area.

(3) A pixel value P(i, j): P(i, j) is a pixel value of pixels of the original image in which a coordinate value is given by (i, j). In the case of the first embodiment, the original image is expressed in the RGB color spaces, and hence, let $r_{ij}$, $g_{ij}$ and $b_{ij}$ respectively be a R-color component value, a G-color component value and a B-color component of the pixels of the original image having the coordinate value of (i, j), then the pixel value is given by P(i, j)=($r_{ij}$, $g_{ij}$, $b_{ij}$).

To start with, in a step S201 shown in FIG. 2, a feature amount of each face area is calculated. Processing in the step S201 is executed in accordance with a flowchart shown in FIG. 4.

Figure 4:
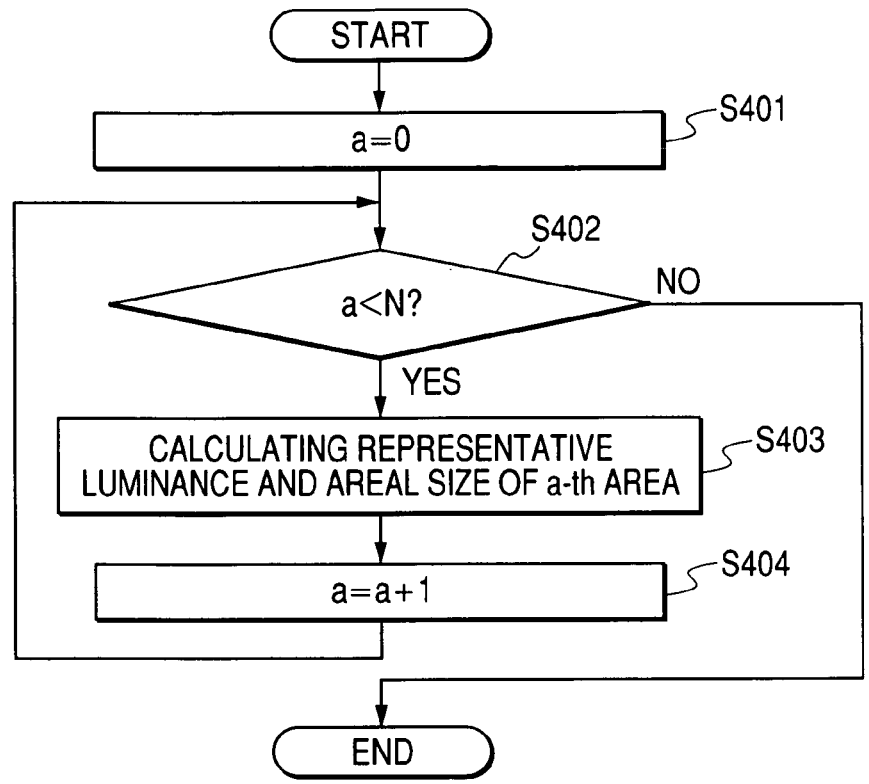
FIG. 4 is a flowchart showing details of processing of calculating a feature amount of each area in FIG. 2.

In a step S401 in FIG. 4, a count value "a" in loop (repetitive) processing of a step S402 through a step S404 is initialized to 0.

The subsequent step S402 is termination judgement processing of the loop processing of the step S402 through the step S404, wherein when the count value "a" is equal to or larger than N, i.e., when the processing in the step S403 with respect to all face area information is terminated, the processing shown in FIG. 4 comes to an end. By contrast, when the count value "a" is less than N, the processing proceeds to the step S403.

In the step S403, a representative luminance and an areal size of an a-th face area are calculated. The representative luminance is a luminance value representative of the a-th face area. According to the first embodiment, an average luminance of the face area is to be employed as the representative luminance. The average luminance can be obtained by extracting (examining) and averaging luminance values of the pixels belonging to the respective face areas.

The discussion in the first embodiment is made on the premise that the RGB values of the pixels are converted into YCbCr color spaces, and Y after the conversion is used as a luminance value. A conversion into YCC from RGB is performed in the following equation (1).

$$\begin{bmatrix} Y \\ C_b \\ C_r \end{bmatrix} = \begin{bmatrix} 0.2990 & 0.5870 & 0.1140 \\ -0.1687 & -0.3313 & 0.5000 \\ 0.5000 & -0.4187 & -0.0813 \end{bmatrix} \begin{bmatrix} R \\ G \\ B \end{bmatrix} \quad (1)$$

Accordingly, a luminance value $Y_{ij}$ of the pixel value P(i, j) having the coordinate value of (i, j) can be obtained by the following equation (2).

$$Y_{ij}=0.2990 \times r_{ij}+0.5870 \times g_{ij}+0.1140 \times b_{ij} \quad (2)$$

Alternatively, it is also considered to employ the following equation (3) as an approximation equation of the equation (2) given above.

$$Y_{ij}=0.3 \times r_{ij}+0.6 \times g_{ij}+0.1 \times b_{ij} \quad (3)$$

Next, an average luminance value $Y_{AV}(a)$ of the a-th face area is calculated by the following equation (4).

$$Y_{AV}(a) = \frac{\sum_{i,j \in Region(a)} Y_{ij}}{S(a)} \quad (4)$$

A parameter region Region(a) in the equation (4) is, however, a region expressed by the area information (a). In the case of the first embodiment, the parameter region Region(a) is a region defined by $x1(a) \leq i \leq x2(a)$ and $y1(a) \leq j \leq y2(a)$ of the original image, and therefore an average luminance value thereof is calculated by extracting the pixel values of the corresponding area of the original image.

Moreover, S(a) in the equation (4) is the number of pixels, i.e., an areal size of the parameter region Region(a) and can be, in the case of the first embodiment, calculated by the equation (5) shown below.

$$S(a)=(x2(a)-x1(a)+1) \times (y2(a)-y1(a)+1) \quad (5)$$

Alternatively, when carrying out the equation (4), S(a) may also be obtained by counting the number of pixels contained in the parameter region Region(a).

It should be noted that the area included in the parameter region Region(a) is given by $x1(a) \leq i \leq x2(a)$ and $y1(a) \leq j \leq y2(a)$ according to the first embodiment. However, what the present invention intends remains unchanged irrespective of whether the sign of inequality includes a sign of equality or not, i.e., whether pixels of a boundary of the face area are included or not.

Further, according to the first embodiment, the average luminance value is used as the representative luminance value, however, a mode (a maximum frequency value) or a median, etc. of the luminance of the face area may also be employed. In this case, instead of the simple averaging processing, a luminance histogram about each area is calculated and a representative luminance value is determined based on this histogram.

The first embodiment has exemplified the case of using the Y-value as the luminance value in the YCC color spaces. However, an L* value in CIEL*a*b* color spaces may be used, or a G-value of RGB may also be employed.

As discussed above, the processing in the step S201 is that the representative luminance value (the average luminance value) $Y_{AV}(a)$ and the areal size S(a) of each face area are calculated as the feature amount of each face area according to the processing in the flowchart shown in FIG. 4.

The discussion gets back to the flowchart shown in FIG. 2.

Figure 3:
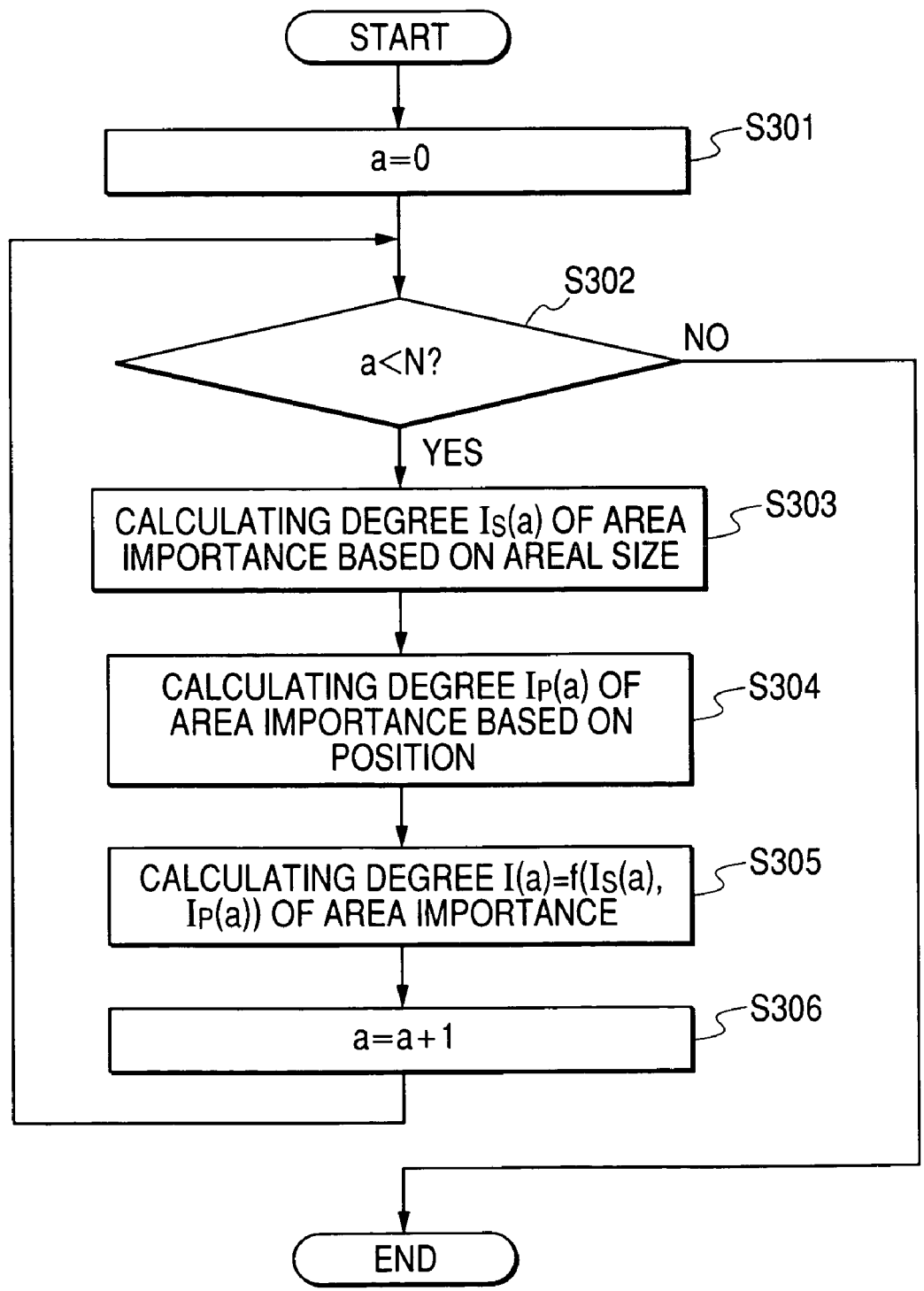
FIG. 3 is a flowchart showing details of processing of calculating an importance degree of each area in FIG. 2.

In the next step S202, an importance degree of each face area is calculated. FIG. 3 is a flowchart showing a processing procedure of the step S202.

In a step S301 in FIG. 3, the count value "a" in the loop processing of a step S302 through a step S306 is initialized to 0. The subsequent step S302 is the termination judgement processing of the loop processing of the step S302 through the step S306.

When the count value "a" is equal to or larger than N, i.e., when the processing in the step S303 through the step S305 with respect to all face area information is terminated, the processing shown in FIG. 3 comes to an end. By contrast, when the count value "a" is less than N, the processing proceeds to the step S303.

The processing in the subsequent steps S303 through S304 is processing for determining an importance degree of each face area, in accordance with the feature amount of the face area. In the image processing apparatus 10 according to the first embodiment, if there are plural number of persons in a photographic image, the importance degree is determined based on the following assumptions 1 and 2.

Assumption 1: A face of a main object photographed is larger than a certain predetermined size.

Assumption 2: The face of the main object photographed is in the vicinity of the center of the image.

The importance degree of each face area is determined based on these assumptions by the processing in the steps S303 through S305.

To begin with, an area importance degree $I_s$ based on the areal size is determined in the step S303. This corresponds to the assumption 1 given above.

Figure 5:
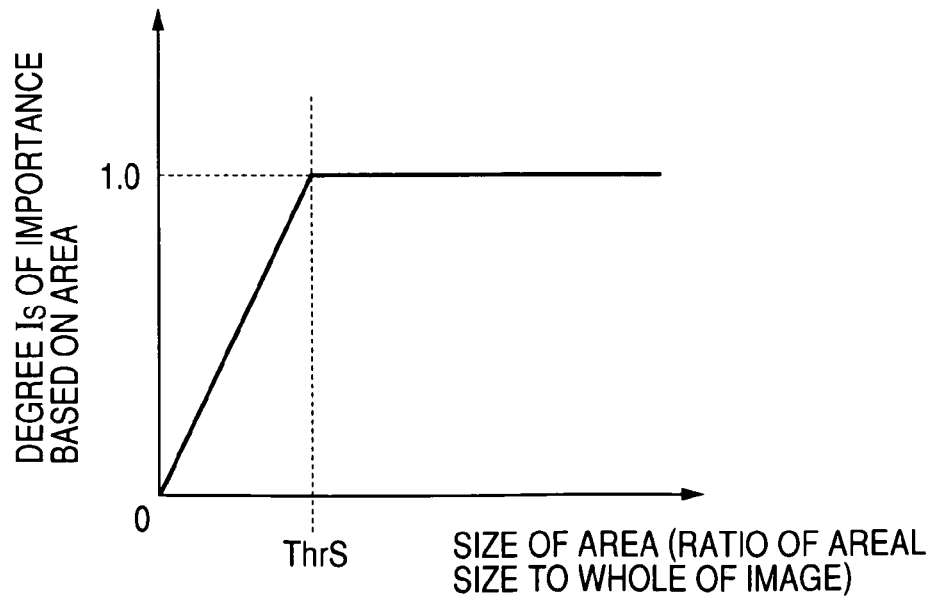
FIG. 5 is a characteristic diagram showing one example of a correspondence relationship between an areal size of a face area and an area importance degree based on the areal size.

FIG. 5 is a characteristic diagram showing one correspondence relational example between the areal size of the face area and the area importance degree $I_s$ based on the areal size. In the characteristic diagram in FIG. 5, an axis of abscissa indicates an areal size ratio of the area to the whole image, and an axis of ordinates indicates an area importance degree based on the areal size. This characteristic diagram represents that, for instance, an object photographed in a size equal to or greater than a considerable ratio (ThrS) in the image, is regarded important, and the importance degree of a photographed object having a size equal to or smaller than that ratio becomes lower as its ratio decreases.

Note that the graph is not limited to the format given above. For example, the importance degree of an object having an areal size ratio equal to or smaller than ThrS is set to zero, while the importance degree of an object equal to or larger than ThrS may be set large in proportion to an areal size ratio thereof, or the importance degree may also be set discretely large as its areal size ratio increases.

Further, when photographing in a way that focus onto persons, there are empirically many cases in which the areal size of the face area becomes equal to or greater than approximately 1%, and hence, for example, the aforementioned ratio (ThrS) can be set to about 1%. Such being the case, in the characteristic diagram shown in FIG. 5, for instance, the axis of abscissa is organized discretely to about 0.1%, and these discrete areal size ratios may be retained as a lookup table.

Namely, in the step S303, the areal size ratio of the face area to the whole image is calculated from an areal size of a target a-th area, i.e., an areal size S(a) of the face area that has been obtained in the step S403 and from a size of the whole image. Then, an area importance degree $I_s(a)$ based on the areal size of the a-th area is determined from the characteristic diagram (structured as the lookup table) in FIG. 5.

It should be noted that the scheme of organizing the correspondence relation between the areal size ratios and the area importance degrees shown in FIG. 5 into the lookup table, is nothing but one example of the embodiment. For example, when the present invention is realized softwarewise, the aforementioned correspondence relation can also be realized by condition branching and by formula-based calculations.

Moreover, what the present invention intends is the calculation of the importance degree of the face area in accordance with the areal size of the face area. Accordingly, the correspondence relation defined in the characteristic diagram in FIG. 5 is one example, and correspondence relations defined in other characteristic diagrams are also available.

In the subsequent step S304, an area importance degree $I_p$ based on a position is determined. This corresponds to the assumption 2 described above.

Figure 6:
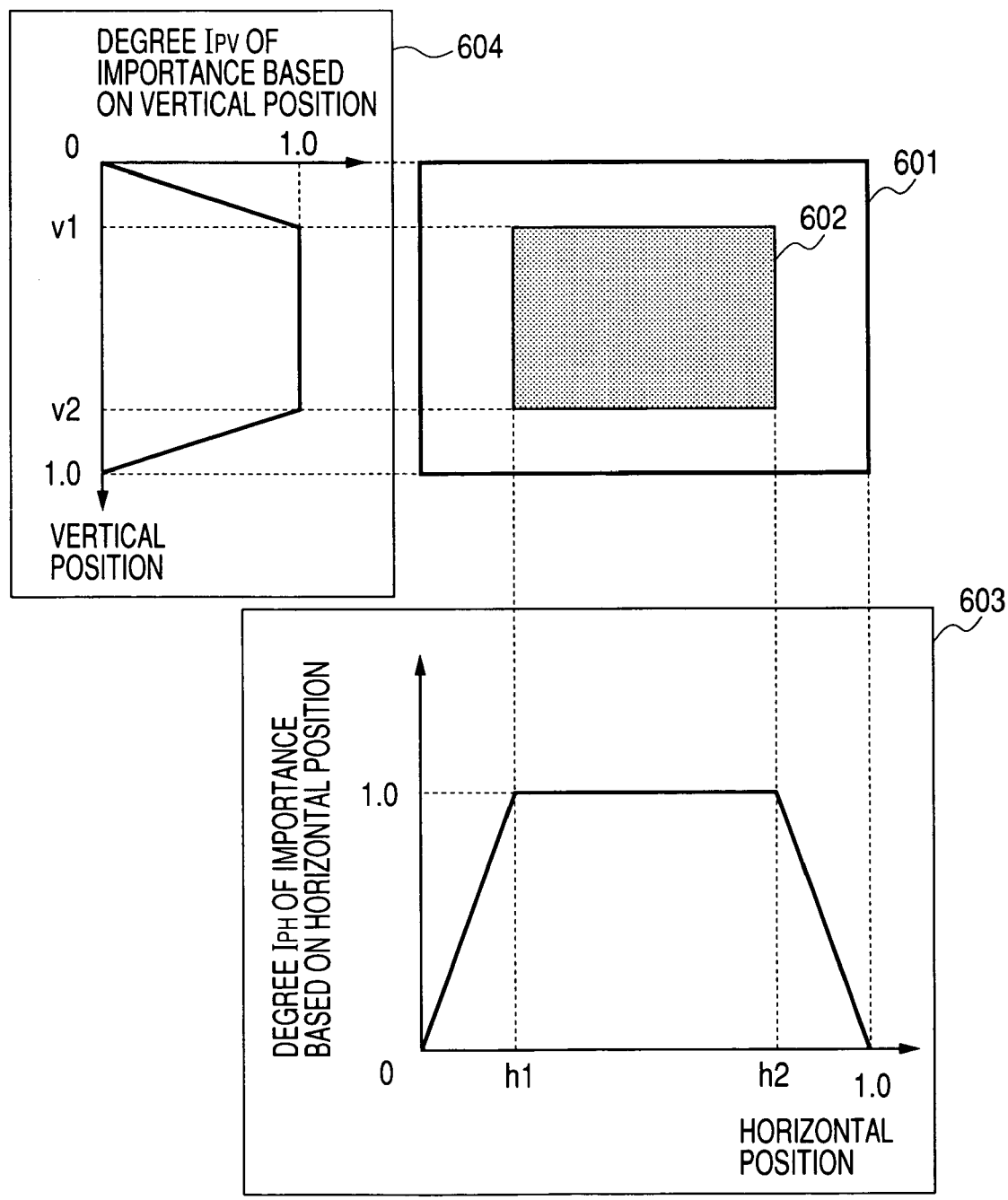
FIG. 6 is a diagram showing one example of a correspondence relationship between a position of the face area and an area importance degree based on the position.

FIG. 6 is a diagram showing one example of a correspondence relation between a position of the face area and the area importance degree $I_p$ based on the position.

The numeral 601 in FIG. 6 denotes an area of the original image. The numeral 602 denotes a predetermined area (h1, v1)-(h2, v2) which is probably an area (face area) in which a face of a person becoming a main object is presumed to be photographed.

Further, the numeral 603 denotes a characteristic diagram showing a correspondence relation between a horizontal position of a target area and an area importance degree. Similarly, the numeral 604 denotes a characteristic diagram showing a correspondence relation between a vertical position of the target area and the area importance degree.

Note that in the characteristic diagrams 603 and 604, the horizontal and vertical positions are normalized by a width and a height of the image, however, this normalization helps only facilitate the explanation, and whether to normalize or not is irrespective of what the present invention intends.

Referring to FIG. 6, symbols h1, h2 in the characteristic diagram 603 denote a range h1-h2 in the horizontal position in the area 602 where the face of the person becoming the main object is expected to be photographed. Further, similarly, symbols v1, v2 in the characteristic diagram 604 denotes a range v1-v2 in the vertical position in the area 602 where the face of the paerson becoming the main object is expected to be photographed. For example, supposing that a size of the area 602 corresponds to a size that is a half (½) of the original image lengthwise and widthwise and that a position of the area 602 corresponds to a central position of the original image, h1 and v1 become such as 0.25=(¼), and h2 and v2 become such as 0.75 (=¾).

In the step S304, the area importance degree $I_p$ is determined according to a correspondence relation between the position of the face area 602 shown in FIG. 6 and the area importance degree $I_p$ based on the position.

At first, one point that is representative of the target a-th face area 602 is determined. According to the first embodiment, a central coordinate position of the face area 602 is obtained.

To describe this specifically, the a-th face area (x1(a), y1(a))-(x2(a), y2(a)) is a rectangular area in which a coordinate value of the point of the left upper corner is (x1(a), y1(a)) and a coordinate value of the point of the right lower corner is (x2(a), y2(a)), and therefore a central coordinate position thereof is given by ((x1(a)+x2(a))÷2, (y1(a)+y2(a))÷2).

With respect to an x-coordinate value and a y-coordinate value of the central coordinate position in the face area 602 that are obtained by the calculations described above, an importance degree $I_{pv}(a)$ based on a vertical position of the a-th face area and an importance degree $I_{pH}(a)$ based on a horizontal position of the a-th face area, are calculated respectively from the correspondence relation between the positions and the area importance degrees expressed in the characteristic diagrams 604 and 603 shown in FIG. 6.

Furthermore, an area importance degree $I_p(a)$ based on the position of the a-th face area is calculated from $I_{pv}(a)$ and $I_{pH}(a)$ given above. According to the first embodiment, the area importance degree $I_p(a)$ based on the position is calculated by multiplying $I_{pv}(a)$ by $I_{pH}(a)$.

The correspondence relations between the positions and the area importance degrees in the characteristic diagrams 603 and 604 in FIG. 6 may be stored as a lookup table in a way that organizes the axes of the horizontal and vertical positions discretely to approximately 0.01 (=1%).

Note that the scheme of organizing the correspondence relation shown in the characteristic diagram in FIG. 6 into the lookup table, is nothing but one example of the embodiment. For example, when the present invention is realized with softwarewise, the aforementioned correspondence relation can also be realized by condition branching and by formula-based calculations.

Moreover, what the present invention intends is the calculation of the importance degree of the face area in accordance with the position of the face area. Accordingly, each of the correspondence relations defined in the characteristic diagrams 603 and 604 in FIG. 6 is one example, and other correspondence relations may also be available.

Further, in the first embodiment, the obtainment of the area importance degree $I_p(a)$ based on the position involves multiplying the importance degree $I_{pv}(a)$ based on the vertical position by the importance degree $I_{pH}(a)$ based on the horizontal position. However, the present invention is not limited to this calculation method. For example, the area importance degree $I_p$ may also be obtained from a maximum value, a minimum value or an average value of the importance degree $I_{pv}$ based on the vertical position and the importance degree $I_{pH}$ based on the horizontal position.

Moreover, in the step S305, an importance degree I(a) of the a-th area is calculated from the importance degree $I_s(a)$ based on the areal size that has been calculated in the step S303 and from the importance degree $I_p(a)$ based on the position that has been calculated in the step S304. In the first embodiment, this importance degree I(a) is set in a relationship such as $I(a)=f(I_s(a), I_p(a))=I_s(a) \times I_p(a)$.

Accordingly, in the step S305, the importance degree I(a) of the a-th area is calculated by multiplying the importance degree $I_s(a)$ based on the areal size by the importance degree $I_p(a)$ based on the position.

Note that the importance degree I(a) of the a-th area is calculated by multiplying the importance degree $I_s(a)$ based on the areal size by the importance degree $I_p(a)$ based on the position according to the first embodiment, however, the present invention is not limited to this calculation method. For instance, the importance degree I(a) may also be obtained from a maximum value, a minimum value or an average value of the importance degree $I_s(a)$ based on the areal size and the importance degree $I_p(a)$ based on the position. Alternatively, weights for the importance degree based on the areal size and for the importance degree based on the position are determined beforehand, and the importance degree I(a) may also be obtained by weight-averaging.

In the subsequent step S306, the count value "a" is incremented by 1, and the operation returns to the processing in the step S302.

The discussion gets back again to the flowchart in FIG. 2.

As explained above, in the step S202, the area importance degree of each face area is calculated according to the flowchart in FIG. 3.

In the subsequent step S203, a correction parameter is calculated in accordance with a feature amount of each face area.

Figure 10:
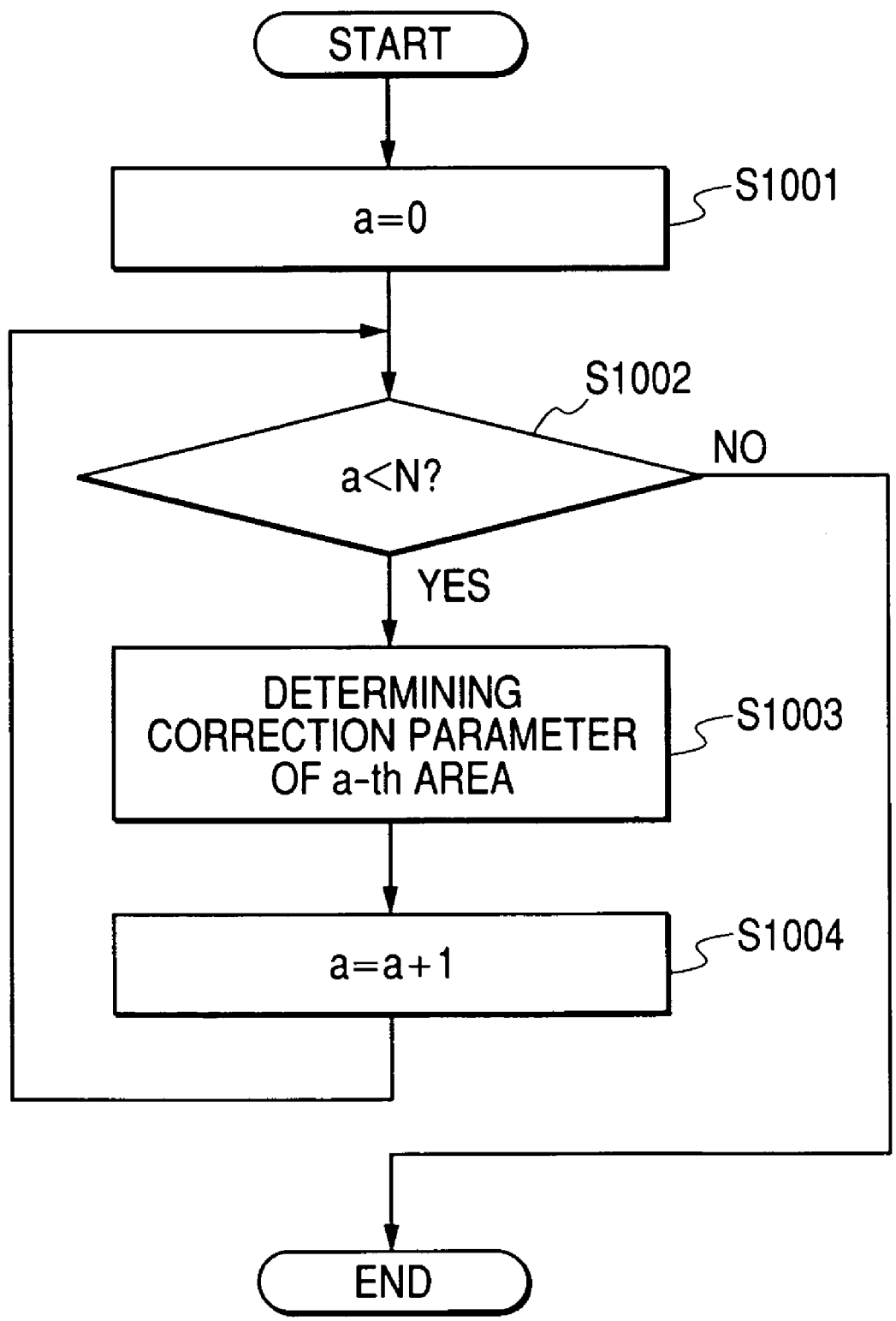
FIG. 10 is a flowchart showing a processing procedure for determining a correction parameter.

FIG. 10 is a flowchart showing a processing procedure for determining the correction parameter.

In a step S1001 in FIG. 10, the count value "a" in the loop processing of a step S1002 through a step S1004 is initialized to 0. The subsequent step S1002 is the termination judgement processing of the loop processing of the steps S1002 through S1004.

When the count value "a" is equal to or larger than N, i.e., when the processing in the step S1003 with respect to all face area information is terminated, the processing shown in FIG. 10 comes to an end. By contrast, when the count value "a" is less than N, the processing proceeds to the step S1003.

In the step S1003, a correction parameter value corresponding to an a-th face area "a" is determined.

According to the first embodiment, a case of calculating a γ-value as the correction parameter value in a γ-correction, will be explained by way of one example. The γ-correction is defined as processing of effecting a pixel conversion of each of the pixels of the image in accordance with the following equation.

$$v_{out} = v_{in}^{\frac{1}{\gamma}} \qquad (6)$$

In the equation (6) given above, $V_{in}$ is an original pixel value normalized to [0, 1.0], $V_{out}$ is a pixel value after the γ-correction that is normalized to [0, 1.0], and γ is a correction parameter value (γ-value). Further, in the equation (6) given above, when γ>1.0, a relationship between the pixel values $V_{out}$ and $V_{in}$ is given such as $V_{out} \geq V_{in}$. As the pixel value of the pixels rises due to the γ-correction, the pixels are corrected brighter owing to the γ-correction.

Conversely when γ<1.0, the relationship becomes $V_{out} \leq V_{in}$. As the pixel value of the pixels decreases due to the γ-correction, the pixels are corrected darker owing to the γ-correction. The following is an in-depth description of these corrections.

To begin with, according to the first embodiment, the representative luminance value of the area is used as the feature amount of the face area. This representative luminance value is a value determined in the step S403 described above.

Figure 8:
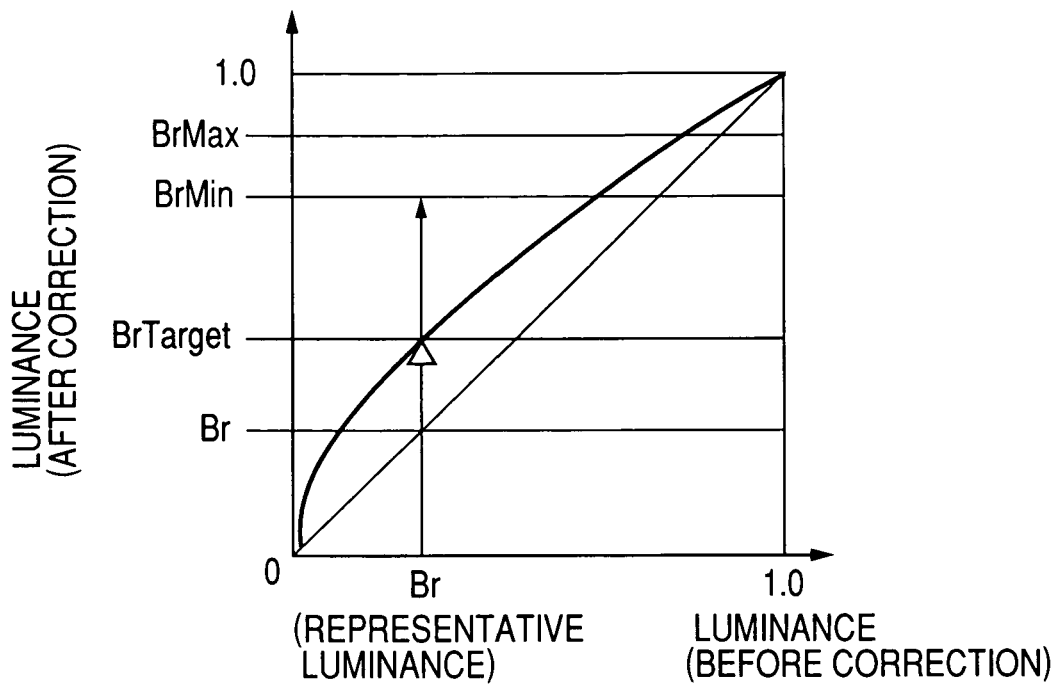
FIG. 8 is an explanatory diagram of a method of determining a $\gamma$-value from a representative luminance value of the face area.

FIG. 8 is an explanatory diagram of a method of determining the γ-value from the representative luminance value of the face area.

In the characteristic diagram in FIG. 8, the axis of abscissa indicates the luminance value (normalized to [0, 1.0]) before the correction, and the axis of ordinates indicates the luminance value (normalized to [0, 1.0]) after the correction.

It is general that preferable brightness of the face in the photographic image is approximately 60% to 80%, and luminance values BrMin and MrMax after the correction in the characteristic diagram shown in FIG. 8 correspond respectively to a minimum value and a maximum value of this preferable brightness. The numerical values of 60% to 80% are no more than one example in every aspect, and BrMin and BrMax are not required to be these numerical values.

Now, supposing that Br be the representative luminance value of the target face area, Br is made closer to a range of BrMin-BrMax of the luminance value. In the case shown in FIG. 8, the representative luminance value Br is smaller than the luminance value BrMin after the correction, and it is therefore preferable that the representative luminance value Br is corrected to get closer to the luminance value BrMin after the correction.

When the original luminance value Br is actually so corrected as to become BrMin after the correction, however, there might frequently occur inconveniences such as a gradation irregularity and enhanced noises if the face area exhibits deep darkness.

Such being the case, a lever value BrTarget is set between the original level value Br and a target level value BrMin. Then, when an input level is the original level value Br, the γ-value is determined so that an output level thereof becomes BrTarget. The following equation (7) manifests this determining method.

$$BrTarget = \begin{cases} \alpha(Br\text{Min} - Br) & (Br < Br\text{Min}) \\ Br & (Br\text{Min} \leq Br \leq Br\text{Max}) \\ \alpha(Br - Br\text{Max}) & (Br > Br\text{Max}) \end{cases} \quad (7)$$

A coefficient α in the equation (7) given above is a parameter for indicating an intensity of the correction and is set beforehand. Note that a test shows that a preferable result was acquired when the coefficient α is set to a value of approximately ½ to ¼.

Further, the γ-value can be obtained by the following equation (8).

$$\gamma = \frac{\log Br}{\log BrTarget} \quad (8)$$

In the step S1003, a representative luminance value $Y_{AV}(a)$ of the face area (a), which has been determined in the step S403, is substituted into the level value Br in the equation (7) and the equation (8), and γ(a) as the γ-value corresponding to the face area (a) is calculated.

Next, in the step S1004, the count value "a" is incremented by 1, and the operation returns to the processing in the step S1002.

The discussion gets back to the flowchart in FIG. 2.

Finally, the correction parameter values based on the feature amounts of the respective face areas, which have been calculated in the step S203, are synthesized in accordance with the area importance degrees of the individual face areas, which have been calculated in the step S202, thereby calculating a single correction parameter value. This synthesization processing involves performing a calculation in the next equation and thus determining the final correction parameter (γ-value).

$$\gamma = \frac{\sum_{m=0}^{N-1} I(m) \times \gamma(m)}{\sum_{m=0}^{N-1} I(m)} \quad (9)$$

Namely, the aforementioned equation (9) shows that the final correction parameter value γ is calculated by weight-averaging the correction parameter values γ(m) for the respective face areas m with the area importance degree I(m) of the individual face areas.

In the step S204, the final correction parameter value is determined by the processing described above, and the processing shown in FIG. 2 is terminated by outputting this final correction parameter value.

As discussed above, according to the image processing apparatus 10 in the first embodiment, the correction parameter value can be preferably determined in accordance with the position, the areal size and the brightness of each face area in the image containing the plurality of face areas.

It should be noted that the discussion has proceeded so far by giving one example where the correction parameter value is the γ-value, i.e., one-dimensional value in the first embodiment, however, the present invention is not limited to this one-dimensional value. For example, even if the correction parameter value is a multidimensional value, it is self-evident that the present invention can be applied to the case of the multidimensional value by executing independently the processing upon each of the elements, which has been explained in the first embodiment.

According to the first embodiment, there has been made the discussion on the case where both of the importance degree based on the areal size of the area and the importance degree based on the position of the area are calculated, and these importance degrees are synthesized. However, there is no problem if only one of these two importance values is employed.

In that case, there may be used any one of the importance degrees calculated for obtaining the final area importance degree. In this case, the step 305 as the synthesizing step of synthesizing the area importance degrees is redundant and is therefore omitted.

Second Embodiment

A description of a second embodiment will be focused on different portions from the first embodiment discussed above.

Some of known face detection processes are capable of outputting credibility (reliability) of each of the face areas. The second embodiment will exemplify an example of reflecting, in the case of employing the face detection process of outputting the credibility for setting the face area, the credibility outputted by this face detection process in determining a correction parameter.

To start with, input information of the image processing apparatus according to the second embodiment involves using the original image data (including information about the width and the height of the image) explained in connection with the image processing apparatus in the first embodiment, two or more area information, the number of areas and, in addition, a credibility value R(n) ($0 \leq n \leq N$) of each area.

Figure 11:
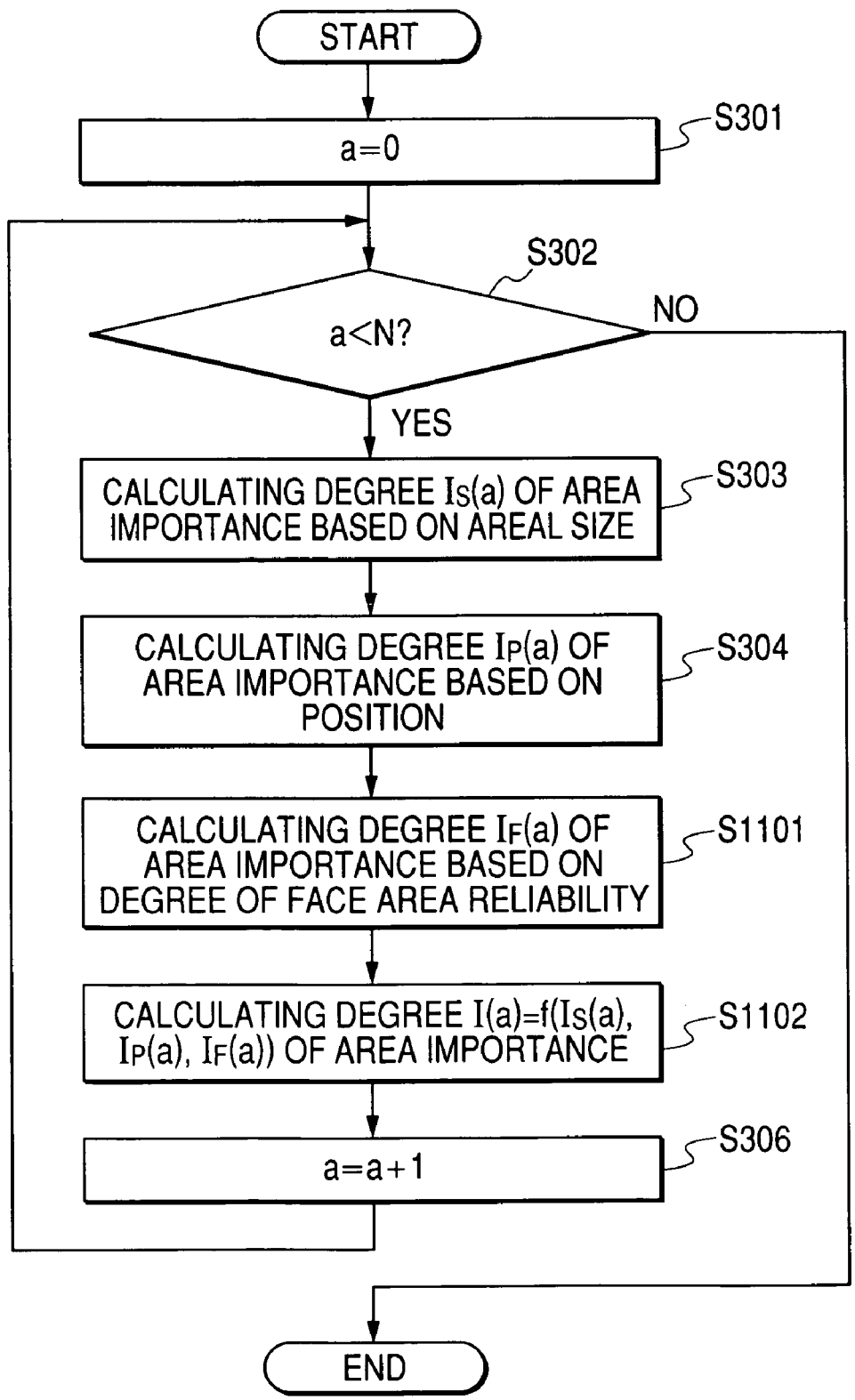
FIG. 11 is an explanatory diagram of processing of calculating an area importance degree.

FIG. 11 shows processing of calculating the area importance degree in the second embodiment. The calculation processing shown in FIG. 11 has such a sequence that processing is added by one step (a step S1101) posterior to the step S304 shown in FIG. 3. Then, the processing in the step S305 is replaced by a step S1102. Therefore, the same processing as in FIG. 3 is denoted with the same numeral of the step, and the repetitive explanation thereof is omitted.

In the step S1101 shown in FIG. 11, an importance degree $I_F(a)$ of the face area is determined in accordance with the credibility of each face area.

As for the face area credibility value outputted by the face detection process, there are a case in which the credibility becomes higher as its value gets larger, and a case in which the credibility becomes high as its value gets smaller conversely. At first, the larger-credibility-value the higher-credibility case will be explained.

When the credibility rises according to the credibility value of the face area, and when the credibility value is normalized to, e.g., [0, 1.0] or [0, 100], the credibility value is re-normalized to [0, 1.0] as the necessity arises, and this value is outputted as $I_F(a)$.

In contrast, when the credibility value is not normalized, to begin with, a value into which each credibility value is divided by a maximum value $R_{max}$ of the obtained credibility value and then normalized, i.e., $R(n)/R_{max}$, is outputted as the importance value $I_F(a)$ of the face area. Herein, $R(n)$ represents each credibility value.

On the other hand, in the case where the credibility becomes higher as the credibility value gets smaller, after the normalization processing has been executed as the necessity has arisen, there is performed a conversion such as $IF(a) =1-R'(n)$ (where $R'(n)$ is what $R(n)$ is normalized to $[0, 1.0]$). Then, the importance degree of the face area may be set smaller as the credibility value gets larger, and conversely the importance degree of the face area may be set larger as the credibility value gets smaller.

In the subsequent step S1102, the final importance degree I(a) is determined from the respective importance degrees determined in steps S303, S304 and S1101. According to the second embodiment, the final area importance degree I(a) is given by $I(a)=f(I_s(a), I_p(a), I_F(a))=I_s(a) \times I_p(a) \times I_F(a)$.

In the calculation equation of the area importance degree I(a), as in the first embodiment, the final importance degree I(a) may also be determined not by the multiplication but from the maximum value, the minimum value and the average value of the respective importance values. Alternatively, weights for the respective importance degrees are previously determined, and the importance degree I(a) may also be obtained by weight-averaging.

Note that the second embodiment has exemplified the case in which there are calculated both of the importance degree based on the areal size of the area and the importance degree based on the position of the area, and these respective importance degrees are synthesized with the importance degree based on the credibility. There is, however, no problem if any one of the importance degree based on the areal size of the area and the importance degree based on the position of the area, is synthesized with the importance degree based on the credibility.

According to the second embodiment, as an addition to the first embodiment, the credibility of each face area is reflected in the correction parameter value. Namely, the face area of which the credibility is judged to be high by the face detection process can be greatly influenced by the finally-determined correction parameter. Conversely, the face area of which the credibility is judged to be low can be slightly influenced by the same parameter. The correction parameter can be thus determined more preferably.

Third Embodiment

In a third embodiment, only different portions from the first embodiment and the second embodiment will be explained.

According to a known Exif (Exchangeable image file format), information acquired when capturing an image can be stored as tags in the image data. According to Exif version 2.2 standards ("Exchangeable Image File Format for Digital Still Cameras: Exif version 2.2", JEITA CP-3451), the image-capture information includes an object (or subject) area (SubjectArea) tag, whereby a position and an area of the major object can be described.

The third embodiment will exemplify an example in which when the image inputted to the image processing apparatus is an Exif-formatted image stored with the information of the object area tag, the importance degree based on the position of each face area is calculated by use of the position or the area indicated by the object area tag.

Figure 7:
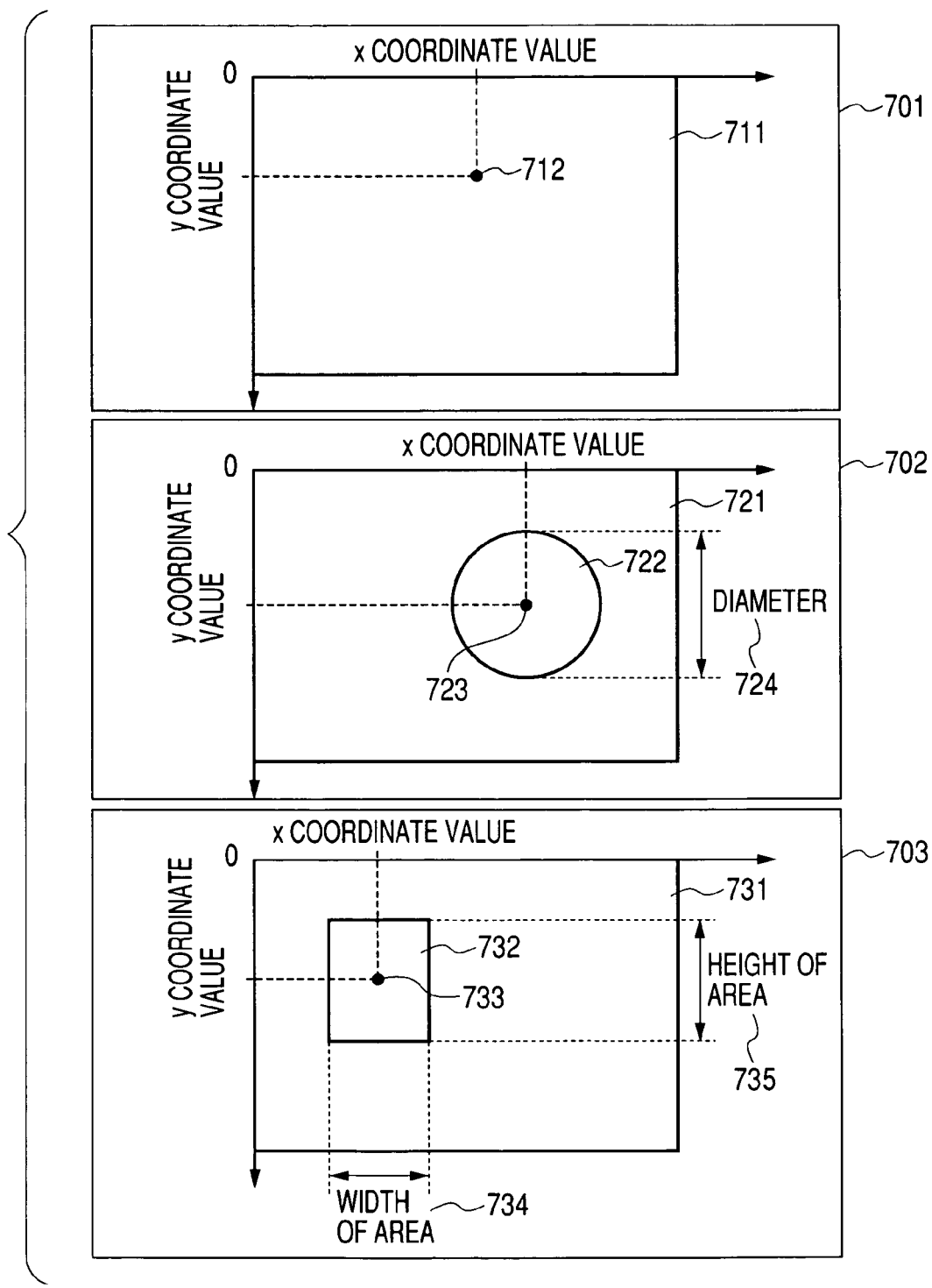
FIG. 7 is a diagram showing examples of three types of areas having information about positions and areas that can be described by object area tags in Exif format.

FIG. 7 is a diagram showing examples of three types of areas having information on positions and areas that can be described by the object area tags in the Exif format, wherein areas 701, 702 and 703 are exemplified as areas including a one-dotted area, a circular area and a rectangular area, respectively.

The area 701 includes an image area 711, in which a numeral 712 denotes a coordinate point indicating a position of the object. If the object position is one point, a coordinate value thereof is stored together with the object area tag.

The area 702 includes an image area 721 and an object area 722. When the object area 722 takes a circular shape, a coordinate value 723 of the center of the circle and a value 724 of a diameter are stored together with the object area tag.

The area 703 includes an image area 731 and an object area 732. When the object area 732 takes a rectangular shape, a coordinate value of the center of the rectangle, a width 734 of the rectangular area and a height 735 of the rectangular area, are stored together with the object area tag.

Figure 12:
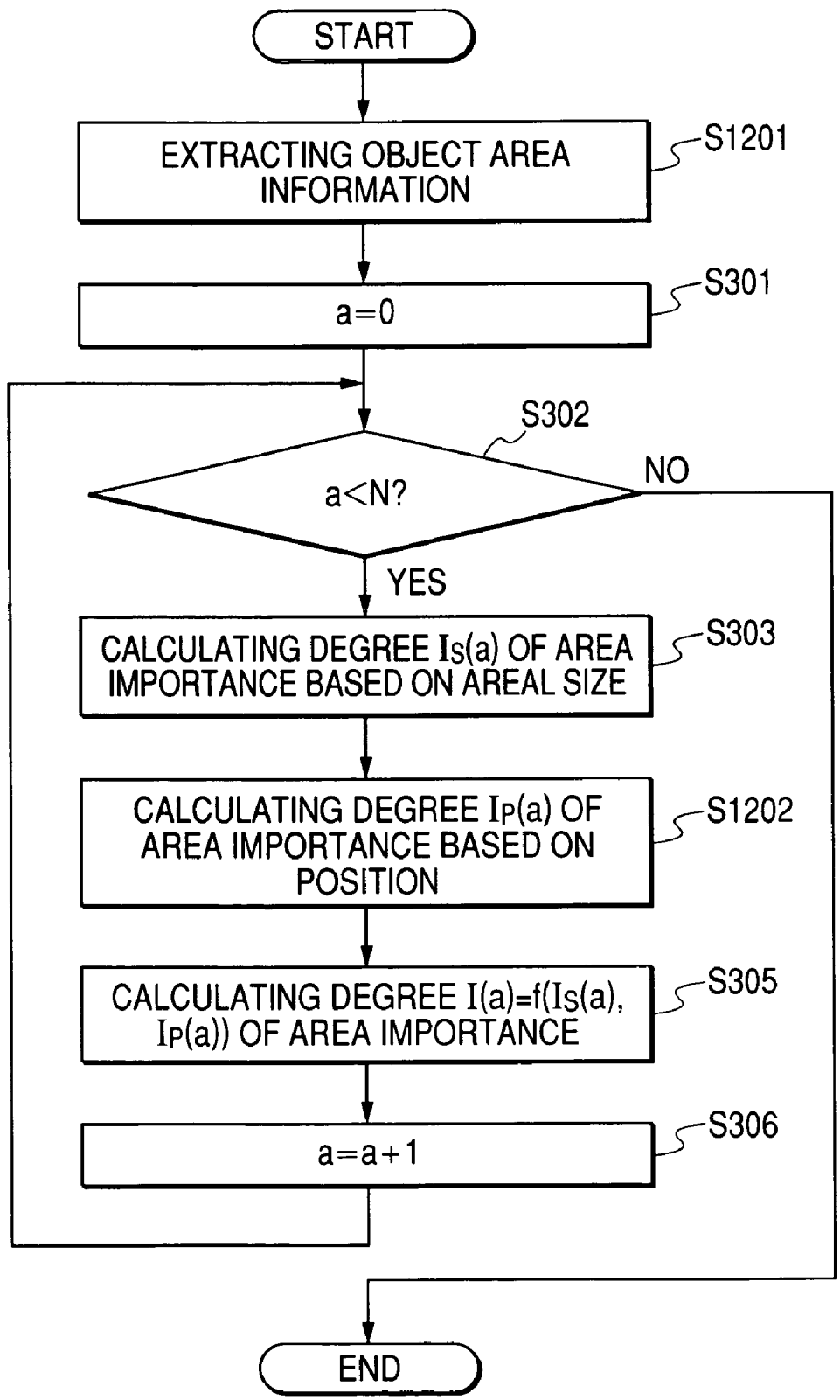
FIG. 12 is a flowchart showing a processing procedure of importance degree determination processing.

FIG. 12 is a flowchart showing a processing procedure of the importance determination processing in the third embodiment. The processing in the flowchart in FIG. 12 has such a sequence that processing is added by one step (a step S1201) anterior to the step S301 shown in FIG. 3 and the step S304 is changed (to a step S1202). Therefore, the same processing is denoted with the same numeral of the step, and the repetitive explanation thereof is omitted.

To start with, in a step S1201 shown in FIG. 12, a header field of the Exif-formatted image data inputted is analyzed, and an object area tag is searched for and then read out.

Further, in a step S1202, an importance degree $I_p(a)$ based on the position is determined.

According to the third embodiment, however, the importance degree $I_p(a)$ is determined from a positional relationship between a target face area and an area indicated by area information stored on the object area tag included in the Exif-formatted image.

Namely, the information about the object area differs according to every image, and hence the position of the face area and the importance degree are not predetermined as in the first embodiment, but that the importance degree is settled by dynamically determining a correspondence relation between the position of the face area and the importance degree.

Figure 13:
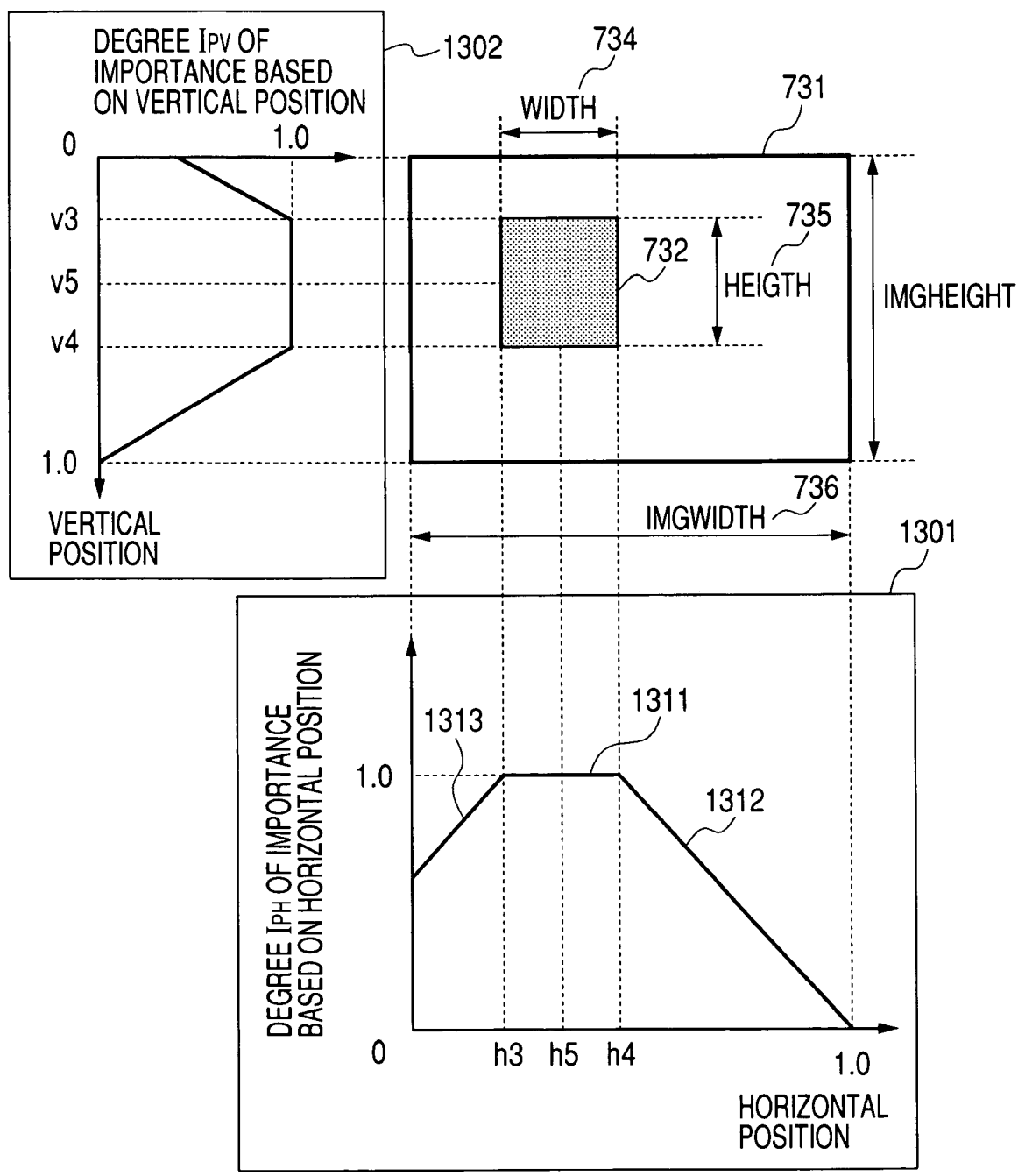
FIG. 13 is a diagram showing one example of dynamically creating, when object area information describes a rectangular shape, a correspondence relationship between a position of the face area and an importance degree from the object area information.

For example, FIG. 13 is a diagram showing one example of dynamically creating the correspondence relation between the position of the face area and the importance degree in accordance with the object area information when the object area information describes a rectangular shape. Herein, areas 731 and 732 in FIG. 13 are identical with the areas indicated by the same numerals in FIG. 7.

At first, when the object area information based on the Exif image format describes the rectangular shape, as explained in FIG. 7, the area information is stored as the information showing a central coordinate position (h5, v5) of the area, a width 734 (width) of the area and a height 735 (height) thereof. In this case, as in the case of the first embodiment, coordinate values of a left upper corner and a right lower corner of the rectangular area are normalized and thus obtained by the following equation (10).

$$h3 = \left(h5 - \frac{width}{2}\right) \div imgwidth \qquad (10)$$

$$h4 = \left(h5 + \frac{width}{2}\right) \div imgwidth$$

-continued $$v3 = \left(v5 - \frac{height}{2}\right) \div imgheight$$

$$v4 = \left(v5 + \frac{height}{2}\right) \div imgheight$$

The numeral 1301 in FIG. 13 shows one example of a characteristic diagram showing the correspondence relation between the position defined in the horizontal direction and the importance degree.

In the correspondence relation shown in the characteristic diagram 1301, the importance degree is set to 1 in a section between h3 to h4, which is the object area. Next, a greater importance degree $I_{PH}$ based on the horizontal position, i.e., the larger of a distance between h4-1.0 and a distance between h3 to 0.0 is calculated, viz., the distance between h4 to 1.0 in FIG. 13 is calculated. Then, an inclination q1 of a straight line 1312 connecting (h4, 1.0) to (1.0, 0.0) is calculated in the equation (11) given below.

$$q_1 = \frac{1.0 - h4}{0.0 - 1.0} = h4 - 1.0 \quad (11)$$

Obtained next is an inclination of a straight line 1313 in a section between 0 to h3 of the importance degree IPH based on the horizontal position. Let q2 be the inclination of this straight line 1313, and the inclination q2 is expressed such as q2=−q1. Similarly, a characteristic diagram showing a correspondence relation between the vertical position and the importance degree, is determined (created).

Explained next is a case in which the object area information based on the Exif image format describes a circular shape.

Figure 14:
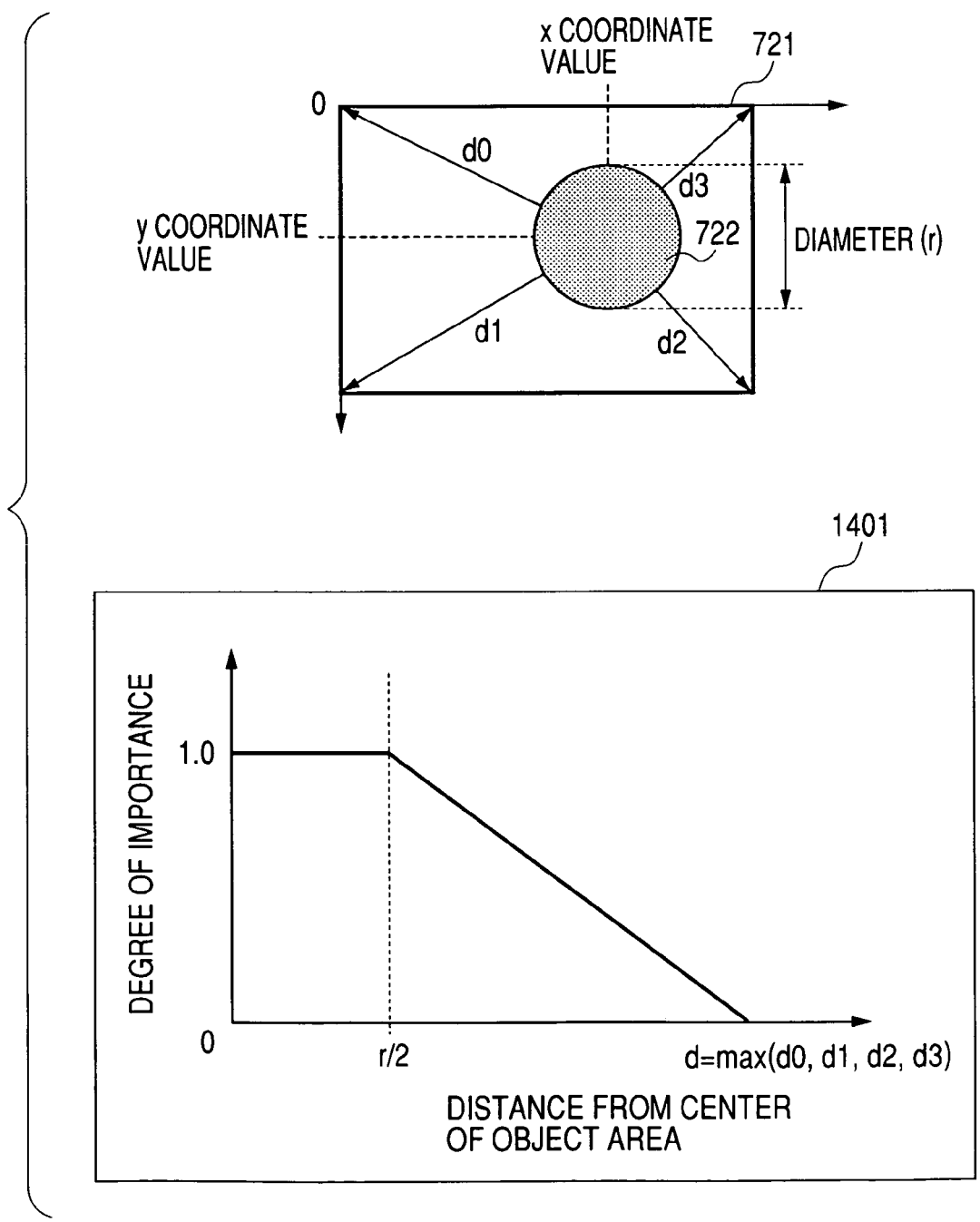
FIG. 14 is a diagram showing one example of dynamically creating, when the object area information describes a circular shape, a correspondence relationship between the position of the face area and the importance degree from the object area information.

FIG. 14 is a diagram showing one example of dynamically creating a correspondence relation between the position of the face area and the importance degree by use of the object area information. Herein, areas 721 and 722 in FIG. 13 are identical with the areas denoted by the same numerals in FIG. 7.

In this case, distances d0 through d3 between the center of the object area and four corners of the image are calculated. Next, a maximum value among the four distances d0 through d3 is obtained to be set as "d", and a correspondence relation as described in a characteristic diagram 1401 is created.

In the characteristic diagram 1401, when the face area exists in an interior of a circular area depicted as the object area, the importance degree is 1. Further, when the face area exists outside the circular area, the correspondence relation is that the importance degree gets smaller as the distance from the circular area becomes larger. In this case, the importance degree is not the importance degree based on the position in the horizontal direction or in the vertical direction but the final importance degree based on the position.

Note that when the object information based on the Exif image format describes a point, this may be considered to be a special version of the case in which the object area takes the circular shape. Namely, this special version may be treated similarly as the case of the circular area, wherein its diameter is 0. Alternatively, this may be treated as the circular area, wherein a predetermined value is set to its diameter, or may also be treated as a rectangular shape by applying predetermined width and height.

Moreover, the Exif file format includes an object position (Subject Location Tag) coming under a category of the already-explained object area tag, and what the present invention intends is the same if this Subject Location Tag is employed.

Further, if the object position is described in other tags such as Maker Note Tag, User Comment Tag, etc., and what the present invention intends is the same if this position is read from such a tag and thus employed.

Furthermore, the object of the present invention is, as a matter of course, attained also by supplying a system or an apparatus with a storage medium stored with software program codes for realizing the functions of the image processing apparatus in the first through third embodiments, and making a computer (or a CPU and an MPU) of the system or the apparatus read and execute the program codes stored on the storage medium.

In this case, the program codes themselves read from the storage medium realize the functions in the first through third embodiments, and the storage medium stored with the program codes and these program codes constitute the present invention.

The storage medium for supplying the program codes can involve using a ROM, a flexible disk, a hard disk, an optical disk, a magneto-optic disk, a CD-ROM, a CD-R, a magnetic tape, a nonvolatile memory card, and so on.

Moreover, the functions in the present embodiment are realized by executing the program codes read by the computer, and, besides, the present invention includes, as a matter of course, a case wherein the functions in the present embodiment are realized by such processing that OS, etc. running on the computer executes part or the whole of actual processes on the basis of instructions of the program codes.

In the case of the present embodiment, as compared with the correction parameter value determined according to the first embodiment and the second embodiment, the preferable correction parameter value suited to the main object area actually detected on the side of the camera, can be determined.

As discussed above, according to the present invention, the correction parameter value for correcting the image information is calculated for each of the plurality of areas included in the image information, and the correction parameter value for correcting the whole of the image information is determined by synthesizing the thus-calculated correction parameter values. Therefore, in the input image information including the plurality of areas for which the correction parameters are calculated, the respective correction parameter values can be integrated corresponding to the position and the areal size of each area or the brightness of the area, and it is possible to determine the correction parameter value by which the whole image can be preferably corrected. The present invention is not limited to the embodiments discussed above and can be modified in a variety of forms within the scope set forth by the following claims.

What is claimed is:

1. A method of determining correction parameters for correcting image information inputted, comprising:
    an information inputting step of inputting the image information and area information about a plurality of areas included in the image information;
    a correction parameter calculating step of calculating a correction parameter value for correcting the image information, for each of the plurality of areas included in the image information inputted in said information inputting step; and a correction parameter synthesizing step of generating a correction parameter value for correcting the inputted image information by synthesizing the respective correction parameters calculated in said correction parameter calculating step.

2. A method of determining correction parameters for preferably correcting image information, comprising:

an information inputting step of inputting the image information and area information about a plurality of areas included in the image information;

a feature amount calculating step of calculating a feature amount of each of the areas included in the image information inputted in said information inputting step;

an area importance degree determining step of determining an importance degree of each of the areas included in the image information inputted in said information inputting step;

a correction parameter value calculating step of calculating a correction parameter value for each of the areas in accordance with the feature amount of each area that is calculated in said area feature amount calculating step; and a correction parameter value synthesizing step of synthesizing the respective correction parameter values corresponding to the feature amounts of the respective areas that are calculated in said correction parameter value calculating step, in accordance with the area importance degrees determined in said area importance degree determining step, wherein a correction parameter value for correcting the whole of the image information is generated by synthesizing the respective correction parameter values.

3. The method according to claim 2, wherein said area importance degree determining step includes a step of determining an areal-size-of-area importance degree in accordance with an areal size of each area.

4. The method according to claim 2, wherein said area importance degree determining step includes a step of determining an area position importance degree in accordance with a position of each area with respect to the input image information.

5. The method according to claim 2, wherein said area importance degree determining step includes;

an areal-size-of-area importance degree determining step of determining an areal-size-of-area importance degree in accordance with an areal size of each area with respect to the input image information;

an area position importance degree determining step of determining an area position importance degree in accordance with a position of each area with respect to the input image information; and an area importance degree synthesizing step of outputting an area importance degree provided by synthesizing the areal-size-of-area importance degree determined in said areal-size-of-area importance degree determining step with the area position importance degree determined in said area position importance degree determining step.

6. The method according to claim 2, wherein the area information of each area included in the input image information, is information about a face area detected by a means for detecting a face, and wherein said area importance degree determining step includes:

a face area importance degree determining step of determining an importance degree for each face area included in the input image information on the basis of a credibility value of every face area inputted in said information inputting step;

at least one of an areal-size-of-area importance degree determining step of determining an areal-size-of-area importance degree in accordance with an areal size of each face area in the input image information, and an area position importance degree determining step of determining an area position importance degree corresponding to a position of each face area in the input image information;

an area credibility importance degree determining step of determining an importance degree of each face area in accordance with a credibility value of every face area inputted in said information inputting step; and a step of synthesizing at least one of the areal-size-of-area importance degree determined in said areal-size-of-area importance degree determining step and the area position importance degree determined in said area position importance degree determining step with the area importance degree determined in said area credibility importance degree determining step, and of outputting the thus-synthesized importance degree.

7. The method according to claim 4, wherein said area position importance degree determining step determines the area position importance degree on the basis of a relationship between a predetermined area range in the input image information and an importance degree exhibited in this area range.

8. The method according to claim 2, wherein the area information about each area included in the input image information is information about the face area detected by said means for detecting the face, and wherein said area position importance degree determining step includes:

a face area importance degree determining step of determining an importance degree for each area included in the input image information on the basis of a credibility value of every face area that is inputted in said information inputting step; and a credibility importance degree determining step of determining an importance degree for each area in accordance with a credibility value of every face area that is inputted in said information inputting step.

9. The method according to claim 4, wherein the image information inputted in said information inputting step is Exif-file-formatted image information, the Exif-file-formatted image information including at least one of an object area tag (Subject Area Tag), an object position tag (Subject Location Tag), a maker note tag (Maker Note Tag) and a user comment tag (User Comment Tag), that is stored with information indicating a position or an area of a main object, and wherein said step of determining the area position importance degree in accordance with the position of each area included in the input image information, determines the area position importance degree from a positional relationship between the positional information or the area information of the main object that is stored in the object area tag, and each area.

10. An apparatus for determining correction parameters for correcting image information inputted, comprising:

information inputting means for inputting the image information and area information about a plurality of areas included in the image information;

correction parameter calculating means for calculating a correction parameter value for correcting the image information for each of the plurality of areas included in the image information inputted by said information inputting means; and correction parameter synthesizing means for generating a correction parameter value for correcting the inputted image information by synthesizing the respective correction parameters calculated by said correction parameter calculating means.

11. An apparatus for determining correction parameters for preferably correcting image information, comprising:
information inputting means for inputting the image information and area information about a plurality of areas including in the image information;
feature amount calculating means for calculating a feature amount of each of the areas included in the image information inputted by said information inputting means;
area importance degree determining means for determining an importance degree of each of the areas included in the image information inputted by said information inputting means; correction parameter value calculating means for calculating a correction parameter value for each of the areas in accordance with the feature amount of each area that is calculated by said area feature amount calculating means; and
correction parameter value synthesizing means for synthesizing the respective correction parameter values corresponding to the feature amounts of the respective areas that are calculated by said correction parameter value calculating means, in accordance with the area importance degrees determined by said area importance degree determining means,
wherein a correction parameter value for correcting the whole of the image information is generated by synthesizing the respective correction parameter values.

12. A computer implemented process for determining correction parameters for correcting image information inputted, said process comprising:
inputting the image information and area information about a plurality of areas included in the image information into a computer;
the computer executing instructions of a computer program to calculate a correction parameter value for correcting the image information for each of the plurality of areas included in the image information inputted in said information inputting step; and
the computer executing instructions of the computer program to generate a correction parameter value for correcting the inputted image information by synthesizing the respective correction parameters calculated in said correction parameter calculating step.

13. A computer implemented process for determining correction parameters for preferably correcting image information, said process comprising:
inputting the image information and area information about a plurality of areas included in the image information into a computer;
the computer executing instructions of a computer program to calculate a feature amount of each of the areas included in the image information inputted in said information inputting step;
the computer executing instructions of the computer program to determine an importance degree of each of the areas contained in the image information inputted by said information inputting step;
the computer executing instructions of the computer program to calculate a correction parameter value for each of the areas in accordance with the feature amount of each area that is calculated in said area feature amount calculating step; and the computer executing instructions of the computer program to synthesize the respective correction parameter values corresponding to the feature amounts of the respective areas that are calculated in said correction parameter value calculating step, in accordance with the area importance degrees determined in said area importance degree determining step,
wherein a correction parameter value for correcting the whole of the image information is generated by synthesizing the respective correction parameter values.

14. A computer-readable storage medium encoded with a computer program for making a computer execute a method of determining correction parameters for correcting image information inputted, said method comprising:
an information inputting step of inputting the image information and area information about a plurality of areas included in the image information;
a correction parameter calculating step of calculating a correction parameter value for correcting the image information for each of the plurality of areas included in the image information inputted in said information inputting step; and
a correction parameter synthesizing step of generating a correction parameter value for correcting the inputted image information by synthesizing the respective correction parameters calculated in said correction parameter calculating step.

15. A computer-readable storage medium encoded with a computer program for making a computer execute a method of determining correction parameters for preferably correcting image information, said method comprising:
an information inputting step of inputting the image information and area information about a plurality of areas included in the image information;
a feature amount calculating step of calculating a feature amount of each of the areas included in the image information inputted in said information inputting step;
an area importance degree determining step of determining an importance degree of each of the areas included in the image information inputted in said information inputting step;
a correction parameter value calculating step of calculating a correction parameter value for each of the areas in accordance with the feature amount of each area that is calculated in said area feature amount calculating step; and
a correction parameter value synthesizing step of synthesizing the respective correction parameter values corresponding to the feature amounts of the respective areas that are calculated by said correction parameter value calculating step, in accordance with the area importance degrees determined in said area importance degree determining step,
wherein a correction parameter value for correcting the whole of the image information is generated by synthesizing the respective correction parameter values.

16. A method of determining correction parameters for preferably correcting image information, comprising:
an information inputting step of inputting the image information and area information about a plurality of areas included in the image information, wherein the area information of each area included in the input image information includes information about a face area detected by a means for detecting a face;

a feature amount calculating step of calculating a feature amount of each of the areas included in the image information inputted in said information inputting step;

an area importance degree determining step of determining an importance degree for each area included in the input image information on the basis of a credibility value of the face area inputted in said information inputting step;

a correction parameter value calculating step of calculating a correction parameter value for each of the areas in accordance with the feature amount of each area that is calculated in said area feature amount calculating step; and a correction parameter value synthesizing step of synthesizing the respective correction parameter values corresponding to the feature amounts of the respective areas that are calculated in said correction parameter value calculating step, in accordance with the area importance degrees determined in said area importance degree determining step, wherein a correction parameter value for correcting the whole of the image information is generated by synthesizing the respective correction parameter values.

17. A method of determining correction parameters for preferably correcting image information, comprising:

an information inputting step of inputting the image information and area information about a plurality of areas included in the image information, wherein the area information of each area included in the input image information includes information about a face area detected by a means for detecting a face;

a feature amount calculating step of calculating a feature amount of each of the areas included in the image information inputted in said information inputting step;

an area importance degree determining step of determining an importance degree for each area included in the input image information on the basis of a position of the face area inputted in said information inputting step;

a correction parameter value calculating step of calculating a correction parameter value for each of the areas in accordance with the feature amount of each area that is calculated in said area feature amount calculating step; and a correction parameter value synthesizing step of synthesizing the respective correction parameter values corresponding to the feature amounts of the respective areas that are calculated in said correction parameter value calculating step, in accordance with the area importance degrees determined in said area importance degree determining step, wherein a correction parameter value for correcting the whole of the image information is generated by synthesizing the respective correction parameter values.

18. A method of determining correction parameters for preferably correcting image information, comprising:

an information inputting step of inputting the image information and area information about a plurality of areas included in the image information, wherein the area information of each area included in the input image information includes information about a face area detected by a means for detecting a face;

a feature amount calculating step of calculating a feature amount of each of the areas included in the image information inputted in said information inputting step;

an area importance degree determining step of determining an importance degree for each area included in the input image information on the basis of an areal size of the face area inputted in said information inputting step;

a correction parameter value calculating step of calculating a correction parameter value for each of the areas in accordance with the feature amount of each area that is calculated in said area feature amount calculating step; and a correction parameter value synthesizing step of synthesizing the respective correction parameter values corresponding to the feature amounts of the respective areas that are calculated in said correction parameter value calculating step, in accordance with the area importance degrees determined in said area importance degree determining step, wherein a correction parameter value for correcting the whole of the image information is generated by synthesizing the respective correction parameter values.

19. A method of determining correction parameters for preferably correcting image information, comprising:

an information inputting step of inputting the image information and area information about a plurality of areas included in the image information, wherein the area information of each area included in the input image information includes information about a face area detected by a means for detecting a face;

a feature amount calculating step of calculating a feature amount of each of the areas included in the image information inputted in said information inputting step;

an area importance degree determining step of determining an importance degree for each area included in the input image information on the basis of a combination of at least two information of a credibility value, a position, and an area size of the face area inputted in said information inputting step;

a correction parameter value calculating step of calculating a correction parameter value for each of the areas in accordance with the feature amount of each area that is calculated in said area feature amount calculating step; and a correction parameter value synthesizing step of synthesizing the respective correction parameter values corresponding to the feature amounts of the respective areas that are calculated in said correction parameter value calculating step, in accordance with the area importance degrees determined in said area importance degree determining step, wherein a correction parameter value for correcting the whole of the image information is generated by synthesizing the respective correction parameter values.

20. An apparatus for determining correction parameters for preferably correcting image information, comprising:

an information inputting unit, which inputs the image information and area information about a plurality of areas included in the image information, wherein the area information of each area included in the input image information includes information about a face area detected by a means for detecting a face;

a feature amount calculating unit, which calculates a feature amount of each of the areas included in the image information inputted by said information inputting unit;

an area importance degree determining unit, which determines an importance degree for each area included in the input image information on the basis of a credibility value of the face area inputted by said information inputting unit;

a correction parameter value calculating unit, which calculates a correction parameter value for each of the areas in accordance with the feature amount of each area that is calculated by said area feature amount calculating unit; and a correction parameter value synthesizing unit, which synthesizes the respective correction parameter values corresponding to the feature amounts of the respective areas that are calculated by said correction parameter value calculating unit, in accordance with the area importance degrees determined by said area importance degree determining unit, wherein a correction parameter value for correcting the whole of the image information is generated by synthesizing the respective correction parameter values.

21. An apparatus for determining correction parameters for preferably correcting image information, comprising:

an information inputting unit, which inputs the image information and area information about a plurality of areas included in the image information, wherein the area information of each area included in the input image information includes information about a face area detected by a means for detecting a face;

a feature amount calculating unit, which calculates a feature amount of each of the areas included in the image information inputted by said information inputting unit;

an area importance degree determining unit, which determines an importance degree for each area included in the input image information on the basis of a position of the face area inputted by said information inputting unit;

a correction parameter value calculating unit, which calculates a correction parameter value for each of the areas in accordance with the feature amount of each area that is calculated by said area feature amount calculating unit; and a correction parameter value synthesizing unit, which synthesizes the respective correction parameter values corresponding to the feature amounts of the respective areas that are calculated by said correction parameter value calculating unit, in accordance with the area importance degrees determined by said area importance degree determining unit, wherein a correction parameter value for correcting the whole of the image information is generated by synthesizing the respective correction parameter values.

22. An apparatus for determining correction parameters for preferably correcting image information, comprising:

an information inputting unit, which inputs the image information and area information about a plurality of areas included in the image information, wherein the area information of each area included in the input image information includes information about a face area detected by a means for detecting a face;

a feature amount calculating unit, which calculates a feature amount of each of the areas included in the image information inputted by said information inputting unit;

an area importance degree determining unit, which determines an importance degree for each area included in the input image information on the basis of an area size of the face area inputted by said information inputting unit;

a correction parameter value calculating unit, which calculates a correction parameter value for each of the areas in accordance with the feature amount of each area that is calculated by said area feature amount calculating unit; and a correction parameter value synthesizing unit, which synthesizes the respective correction parameter values corresponding to the feature amounts of the respective areas that are calculated by said correction parameter value calculating unit, in accordance with the area importance degrees determined by said area importance degree determining unit, wherein a correction parameter value for correcting the whole of the image information is generated by synthesizing the respective correction parameter values.

23. An apparatus for determining correction parameters for preferably correcting image information, comprising:

an information inputting unit, which inputs the image information and area information about a plurality of areas included in the image information, wherein the area information of each area included in the input image information includes information about a face area detected by a means for detecting a face;

a feature amount calculating unit, which calculates a feature amount of each of the areas included in the image information inputted by said information inputting unit;

an area importance degree determining unit, which determines an importance degree for each area included in the input image information on the basis of a combination of at least two information of a credibility value, a position, and an area size of the face area inputted by said information inputting unit;

a correction parameter value calculating unit, which calculates a correction parameter value for each of the areas in accordance with the feature amount of each area that is calculated by said area feature amount calculating unit; and a correction parameter value synthesizing unit, which synthesizes the respective correction parameter values corresponding to the feature amounts of the respective areas that are calculated by said correction parameter value calculating unit, in accordance with the area importance degrees determined by said area importance degree determining unit, wherein a correction parameter value for correcting the whole of the image information is generated by synthesizing the respective correction parameter values.

24. A computer-readable storage medium, comprising a program code for causing a computer to execute a method of determining correction parameters for preferably correcting image information, said method comprising:

an information inputting step of inputting the image information and area information about a plurality of areas included in the image information, wherein the area information of each area included in the input image information includes information about a face area detected by a means for detecting a face;

a feature amount calculating step of calculating a feature amount of each of the areas included in the image information inputted in said information inputting step;

an area importance degree determining step of determining an importance degree for each area included in the input image information on the basis of a credibility value of the face area inputted in said information inputting step;

a correction parameter value calculating step of calculating a correction parameter value for each of the areas in accordance with the feature amount of each area that is calculated in said area feature amount calculating step; and a correction parameter value synthesizing step of synthesizing the respective correction parameter values corresponding to the feature amounts of the respective areas that are calculated in said correction parameter value calculating step, in accordance with the area importance degrees determined in said area importance degree determining step, wherein a correction parameter value for correcting the whole of the image information is generated by synthesizing the respective correction parameter values.

25. A computer-readable storage medium, comprising a program code for causing a computer to execute a method of determining correction parameters for preferably correcting image information, said method comprising:

an information inputting step of inputting the image information and area information about a plurality of areas included in the image information, wherein the area information of each area included in the input image information includes information about a face area detected by a means for detecting a face;

a feature amount calculating step of calculating a feature amount of each of the areas included in the image information inputted in said information inputting step;

an area importance degree determining step of determining an importance degree for each area included in the input image information on the basis of a position of the face area inputted in said information inputting step;

a correction parameter value calculating step of calculating a correction parameter value for each of the areas in accordance with the feature amount of each area that is calculated in said area feature amount calculating step; and a correction parameter value synthesizing step of synthesizing the respective correction parameter values corresponding to the feature amounts of the respective areas that are calculated in said correction parameter value calculating step, in accordance with the area importance degrees determined in said area importance degree determining step, wherein a correction parameter value for correcting the whole of the image information is generated by synthesizing the respective correction parameter values.

26. A computer-readable storage medium, comprising a program code for causing a computer to execute a method of determining correction parameters for preferably correcting image information, said method comprising:

an information inputting step of inputting the image information and area information about a plurality of areas included in the image information, wherein the area information of each area included in the input image information includes information about a face area detected by a means for detecting a face;

a feature amount calculating step of calculating a feature amount of each of the areas included in the image information inputted in said information inputting step;

an area importance degree determining step of determining an importance degree for each area included in the input image information on the basis of an areal size of the face area inputted in said information inputting step;

a correction parameter value calculating step of calculating a correction parameter value for each of the areas in accordance with the feature amount of each area that is calculated in said area feature amount calculating step; and a correction parameter value synthesizing step of synthesizing the respective correction parameter values corresponding to the feature amounts of the respective areas that are calculated in said correction parameter value calculating step, in accordance with the area importance degrees determined in said area importance degree determining step, wherein a correction parameter value for correcting the whole of the image information is generated by synthesizing the respective correction parameter values.

27. A computer-readable storage medium, comprising a program code for causing a computer to execute a method of determining correction parameters for preferably correcting image information, said method comprising:

an information inputting step of inputting the image information and area information about a plurality of areas included in the image information, wherein the area information of each area included in the input image information includes information about a face area detected by a means for detecting a face;

a feature amount calculating step of calculating a feature amount of each of the areas included in the image information inputted in said information inputting step;

an area importance degree determining step of determining an importance degree for each area included in the input image information on the basis of a combination of at least two information of a credibility value, a position, and an area size of the face area inputted in said information inputting step;

a correction parameter value calculating step of calculating a correction parameter value for each of the areas in accordance with the feature amount of each area that is calculated in said area feature amount calculating step; and a correction parameter value synthesizing step of synthesizing the respective correction parameter values corresponding to the feature amounts of the respective areas that are calculated in said correction parameter value calculating step, in accordance with the area importance degrees determined in said area importance degree determining step, wherein a correction parameter value for correcting the whole of the image information is generated by synthesizing the respective correction parameter values.

28. A computer-readable storage medium storing a computer-executable program comprising a program code for causing a computer to execute said method according to claim 16.

29. A computer-readable storage medium storing a computer-executable program comprising a program code for causing a computer to execute said method according to claim 17.

30. A computer-readable storage medium storing a computer-executable program comprising a program code for causing a computer to execute said method according to claim 18.

31. A computer-readable storage medium storing a computer-executable program comprising a program code for causing a computer to execute said method according to claim 19.

* * * * *